US 12,401,301 B2

(12) United States Patent
Sato et al.

(10) Patent No.: US 12,401,301 B2
(45) Date of Patent: Aug. 26, 2025

(54) DRIVE APPARATUS OF SYNCHRONOUS MOTOR AND METHOD FOR DRIVING SYNCHRONOUS MOTOR

(71) Applicant: Hitachi Astemo, Ltd., Hitachinaka (JP)

(72) Inventors: Hiroaki Sato, Tokyo (JP); Hirokazu Matsui, Hitachinaka (JP); Toshisada Mitsui, Hitachinaka (JP); Kohei Myoen, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 129 days.

(21) Appl. No.: 18/279,088

(22) PCT Filed: Aug. 31, 2021

(86) PCT No.: PCT/JP2021/032019
§ 371 (c)(1),
(2) Date: Aug. 28, 2023

(87) PCT Pub. No.: WO2022/195921
PCT Pub. Date: Sep. 22, 2022

(65) Prior Publication Data
US 2024/0146222 A1 May 2, 2024

(30) Foreign Application Priority Data
Mar. 16, 2021 (JP) .................................. 2021-042673

(51) Int. Cl.
*H02P 21/18* (2016.01)
*H02P 21/22* (2016.01)

(52) U.S. Cl.
CPC .............. *H02P 21/18* (2016.02); *H02P 21/22* (2016.02); *H02P 2207/05* (2013.01)

(58) Field of Classification Search
CPC ...... H02P 21/18; H02P 21/22; H02P 2207/05; H02P 6/185; H02P 25/089; H02P 2203/03; H02P 21/32
See application file for complete search history.

(56) References Cited

U.S. PATENT DOCUMENTS

| 6,172,498 B1 * | 1/2001 | Schmidt .................. H02P 6/185 |
| | | 318/685 |
| 2006/0113948 A1 | 6/2006 | Kaneko et al. |

(Continued)

FOREIGN PATENT DOCUMENTS

| EP | 2437391 A1 * | 4/2012 | .............. H02P 27/06 |
| JP | 2002-78391 A | 3/2002 | |

(Continued)

OTHER PUBLICATIONS

International Search Report (PCT/ISA/210) issued in PCT Application No. PCT/JP2021/032019 dated Nov. 9, 2021 with English translation (4 pages).

(Continued)

*Primary Examiner* — Bickey Dhakal
(74) *Attorney, Agent, or Firm* — Crowell & Moring LLP

(57) ABSTRACT

A drive apparatus of a synchronous motor includes a current detecting unit that detects a phase current flowing to the synchronous motor and a magnetic pole position estimating unit that estimates a magnetic pole position of a rotor of the synchronous motor. The magnetic pole position estimating unit includes a first peak-to-peak detector that detects a first peak-to-peak value representing a difference between a maximum value and a minimum value of the phase current, a quadrature component detector that detects a quadrature component of the phase current, and a second peak-to-peak detector that detects a second peak-to-peak value representing a difference between a maximum value and a minimum value of the quadrature component. The magnetic pole (Continued)

position estimating unit calculates a first magnetic pole position and estimates an initial magnetic pole position of the rotor, based on the first magnetic pole position.

9 Claims, 15 Drawing Sheets

(56) References Cited

U.S. PATENT DOCUMENTS

| | | | |
|---|---|---|---|
| 2007/0296371 A1* | 12/2007 | Aoki | H02P 6/182 |
| | | | 318/700 |
| 2011/0050140 A1 | 3/2011 | Sakai et al. | |
| 2016/0268936 A1 | 9/2016 | Chi | |
| 2020/0266745 A1* | 8/2020 | Tachibana | H02P 21/32 |
| 2020/0295688 A1 | 9/2020 | Yoshikawa et al. | |
| 2021/0399663 A1* | 12/2021 | Ho | H02P 27/06 |

FOREIGN PATENT DOCUMENTS

| | | |
|---|---|---|
| JP | 2006-158101 A | 6/2006 |
| JP | 2011-50198 A | 3/2011 |
| JP | 2015-15830 A | 1/2015 |
| JP | 2016-171741 A | 9/2016 |
| JP | 2020-150656 A | 9/2020 |

OTHER PUBLICATIONS

Japanese-language Written Opinion (PCT/ISA/237) issued in PCT Application No. PCT/JP2021/032019 dated Nov. 9, 2021 with English translation (6 pages).

* cited by examiner

CASE OF INTERIOR PERMANENT MAGNET SYNCHRONOUS MOTOR

CASE OF SURFACE PERMANENT MAGNET SYNCHRONOUS MOTOR

DRIVE APPARATUS OF SYNCHRONOUS MOTOR AND METHOD FOR DRIVING SYNCHRONOUS MOTOR

TECHNICAL FIELD

The present invention relates to a drive apparatus of a synchronous motor and a method for driving a synchronous motor.

BACKGROUND ART

A permanent magnet synchronous motor (hereinafter, synchronous motor) including a permanent magnet in a rotor is used in an electrified vehicle typified by a hybrid vehicle and an electric vehicle. Synchronous motors are mainly divided into an interior permanent magnet synchronous motor having a structure in which a permanent magnet is embedded in a rotor and a surface permanent magnet synchronous motor in which a permanent magnet is disposed on a surface of a rotor. In an electrified vehicle, the interior permanent magnet synchronous motor is used for driving the vehicle, and the surface permanent magnet synchronous motor is often used for an electric power steering device and an electric brake device. In order to control the synchronous motor, an inverter which is a power converter is generally used. As a method of controlling torque of the synchronous motor by an inverter, current vector control is generally known. In order to perform the current vector control, there is a need to accurately ascertain a magnetic pole position of a rotor of the synchronous motor. As one of means for ascertaining the magnetic pole position, a resolver which is a position sensor is often provided in the synchronous motor.

However, the resolver provided in the synchronous motor results in an increase in the number of components of a system, an increase in size, and an increase in costs. In addition, an output winding for outputting a position signal is wound around the resolver, and there is a risk of a malfunction due to disconnection or short circuit of the output winding. In addition, the risk of a malfunction also causes a decrease in reliability of the system.

In this respect, position sensorless vector control is generally known as a technology of driving a synchronous motor without using a sensor such as a resolver. The position sensorless vector control detects or estimates an induced voltage of a synchronous motor to obtain position information of a rotor and perform current vector control. When the position sensorless vector control is employed, there is no need to provide a position sensor such as a resolver, and thus, it is possible to prevent the above-described problems caused by the position sensor, such as an increase in size and costs and a decrease in reliability of the system.

In order to perform the position sensorless vector control, it is necessary to detect a rotor position (initial magnetic pole position) while a synchronous motor is stopped; however, when the synchronous motor is stopped, it is not possible to detect or estimate an induced voltage of the synchronous motor. Therefore, it is necessary to detect or estimate the initial magnetic pole position by another method.

As a method for estimating an initial magnetic pole position of a synchronous motor, technologies of Patent Literature 1 and 2 are known. Patent Literature 1 discloses a method for estimating an initial magnetic pole position using saliency of a synchronous motor. Patent Literature 2 discloses a method for estimating an initial magnetic pole position using magnetic saturation.

CITATION LIST

Patent Literatures

PTL 1: JP 2002-78391 A
PTL 2: JP 2016-171741 A

SUMMARY OF INVENTION

Technical Problem

A synchronous motor having saliency has a property of changing inductance depending on a rotor position. In Patent Literature 1, using such rotor position dependency of the inductance, a harmonic voltage is applied to a synchronous motor, and an initial magnetic pole position is estimated from a detection result of a current generated in the synchronous motor at that time. However, in a case of a synchronous motor having no saliency like a surface permanent magnet synchronous motor, the rotor position dependency of the inductance cannot be obtained. Therefore, the method for estimating the initial magnetic pole position in Patent Literature 1 is applicable to an interior permanent magnet synchronous motor but is not applicable to the surface permanent magnet synchronous motor.

In addition, when the voltages are sequentially applied to three phases of the synchronous motor, the inductance decreases due to magnetic saturation when the voltage is applied to a phase close to the initial magnetic pole position, and a magnitude of the current changes. In PTL 2, the initial magnetic pole position is estimated using the magnetic saturation of the synchronous motor. This method has an advantage of being applicable to both the interior permanent magnet synchronous motor and the surface permanent magnet synchronous motor. However, it is known that a magnetic flux in the same direction as a magnetic flux of a permanent magnet and a magnetic flux in a direction orthogonal thereto interfere with each other, and a problem arises in that a significant error occurs in estimation of a magnetic pole position due to the interference.

In this respect, an object of the present invention is to provide a drive apparatus of a synchronous motor and a method for driving a synchronous motor that can be applied to both an interior permanent magnet synchronous motor and a surface permanent magnet synchronous motor and can estimate an initial magnetic pole position with high accuracy.

Solution to Problem

According to the present invention, there is provided a drive apparatus of a synchronous motor including: a power converter that drives a synchronous motor by sequentially applying positive and negative voltages to phases of the synchronous motor; a current detecting unit that detects a phase current flowing to the synchronous motor; and a magnetic pole position estimating unit that estimates a magnetic pole position of a rotor of the synchronous motor, based on the phase current detected by the current detecting unit. The magnetic pole position estimating unit includes a first peak-to-peak detector that detects a first peak-to-peak value representing a difference between a maximum value and a minimum value of the phase current, a quadrature component detector that detects a quadrature component of the phase current, and a second peak-to-peak detector that detects a second peak-to-peak value representing a difference between a maximum value and a minimum value of the quadrature component. The magnetic pole position estimating unit calculates a first magnetic pole position, based on the first peak-to-peak value detected by the first peak-to-peak detector and the second peak-to-peak value detected by the second peak-to-peak detector while the synchronous motor is stopped, and estimates an initial magnetic pole position of the rotor, based on the first magnetic pole position.

According to the present invention, there is provided a method for driving a synchronous motor in a drive apparatus of a synchronous motor which includes a power converter that drives a synchronous motor by sequentially applying positive and negative voltages to phases of the synchronous motor and a current detecting unit that detects a phase current flowing to the synchronous motor, the method including: acquiring a first peak-to-peak value representing a difference between a maximum value and a minimum value of the phase current detected by the current detecting unit and a second peak-to-peak value representing a difference between a maximum value and a minimum value of a quadrature component of the phase current while the synchronous motor is stopped; calculating a first magnetic pole position based on the first peak-to-peak value and the second peak-to-peak value; and estimating an initial magnetic pole position of a rotor of the synchronous motor based on the first magnetic pole position.

Advantageous Effects of Invention

According to the present invention, even when β synchronous motor is either an interior permanent magnet synchronous motor or a surface permanent magnet synchronous motor, an initial magnetic pole position of a rotor of the synchronous motor can be estimated with high accuracy while the synchronous motor is stopped.

DESCRIPTION OF EMBODIMENTS

Hereinafter, embodiments of the present invention will be described with reference to the accompanying drawings. The following description and drawings are examples for describing the present invention and have omissions and are simplified as appropriate for the sake of clarity of description. The present invention can be carried out in various other forms. Unless otherwise specified, each configurational component may be described by a singular or plural form.

First Embodiment

Figure 1:
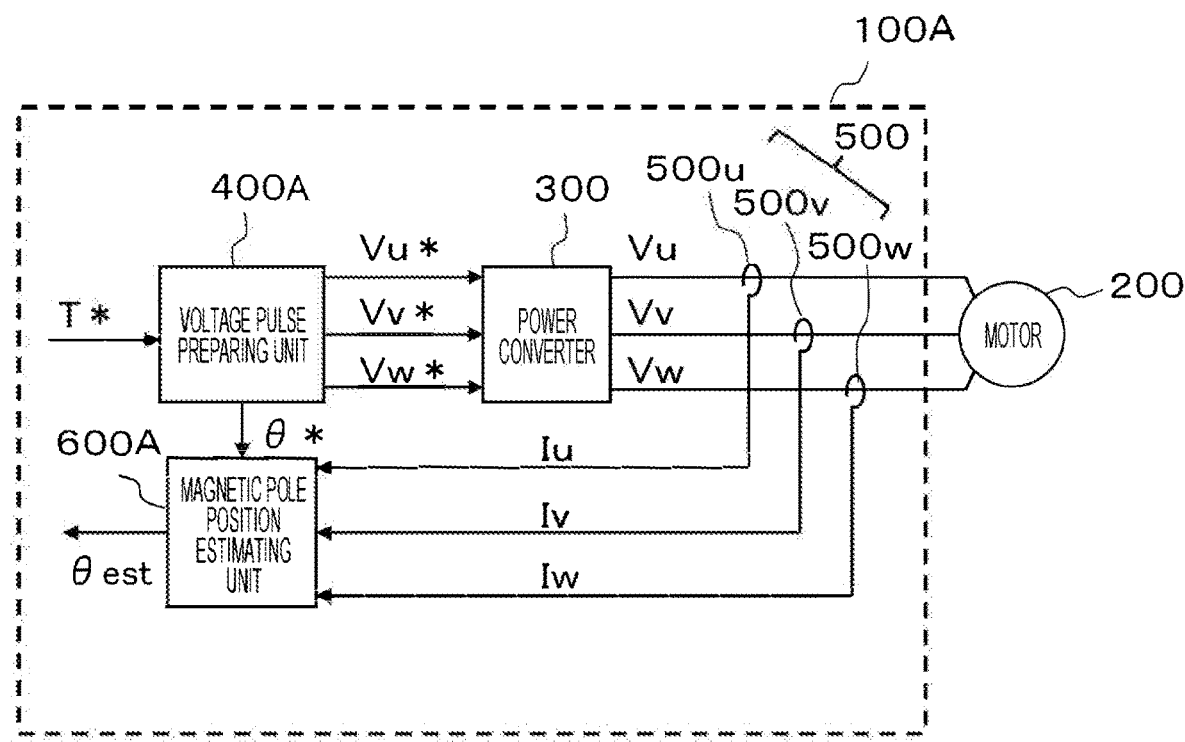
FIG. 1 is a configuration diagram of a drive apparatus according to a first embodiment.

FIG. 1 is a configuration diagram of a drive apparatus 100A according to a first embodiment. The drive apparatus 100A includes a power converter 300, a voltage pulse preparing unit 400A, a current detecting unit 500, and a magnetic pole position estimating unit 600A, and drives a synchronous motor 200.

The synchronous motor 200 is a permanent magnet synchronous motor and includes a permanent magnet (ferromagnet) in a rotor and an armature winding in a stator. Further, in this embodiment, a position sensor that detects a magnetic pole position of the synchronous motor 200 is not provided. Instead, the magnetic pole position is estimated. A case of estimating the magnetic pole position enables to achieve a decrease in size and costs and an increase in reliability of the synchronous motor 200.

When the synchronous motor 200 is driven, the voltage pulse preparing unit 400A prepares voltage commands Vu*, Vv*, and Vw* for sequentially applying positive and negative voltages to phases of a u phase, a v phase, and a w phase of the synchronous motor 200 in response to an input torque command T* and outputs the prepared voltage commands Vu*, Vv*, and Vw* to the power converter 300. The voltage pulse preparing unit 400A prepares the voltage commands Vu*, Vv*, and Vw* based on a magnetic pole position estimated by the magnetic pole position estimating unit 600A. In addition, when an initial magnetic pole position of the synchronous motor 200 is estimated, the voltage pulse preparing unit 400A prepares a predetermined phase command θ* and outputs the phase command θ* to the magnetic pole position estimating unit 600A.

The power converter 300 is, for example, an inverter and performs a pulse width modulation (PWM) on the voltage commands Vu*, Vv*, and Vw* from the voltage pulse preparing unit 400A to perform on/off control of a semiconductor switch element of the power converter when the synchronous motor 200 is driven. Consequently, voltages Vu, Vv, and Vw are applied to the synchronous motor 200 to drive the synchronous motor 200.

The current detecting unit 500 is configured to include current sensors 500u, 500v, and 500w that detect three-phase currents flowing to the synchronous motor 200. The current sensors 500u, 500v, and 500w are disposed for the respective phases of the synchronous motor 200. The current detecting unit 500 detects three-phase currents Iu, Iv, and Iw and outputs the three-phase currents Iu, Iv, and Iw to the magnetic pole position estimating unit 600A. Further, although an example in which the current sensors 500u, 500v, and 500w are respectively arranged for the three phases of the synchronous motor 200 is illustrated, the current sensors may be arranged only for two phases (for example, u phase and v phase) by utilizing the fact that a sum of the three-phase alternating currents is zero. In addition, the three-phase currents of the synchronous motor 200 may be obtained from the current flowing through the DC bus (not illustrated) on an input side of the power converter 300. In these configurations, the number of current sensors can be reduced, and a cost reduction can be achieved.

The magnetic pole position estimating unit 600A estimates a magnetic pole position corresponding to a position of a rotor of the synchronous motor 200 based on the three-phase currents Iu, Iv, and Iw detected by the current detecting unit 500. In addition, while the synchronous motor 200 is stopped, an initial magnetic pole position θest of the rotor of the synchronous motor 200 is estimated based on the three-phase currents Iu, Iv, and Iw detected by the current detecting unit 500 and the phase command θ* output from the voltage pulse preparing unit 400A. Details of the magnetic pole position estimating unit 600A while the synchronous motor 200 is stopped will be described below.

Figure 2:
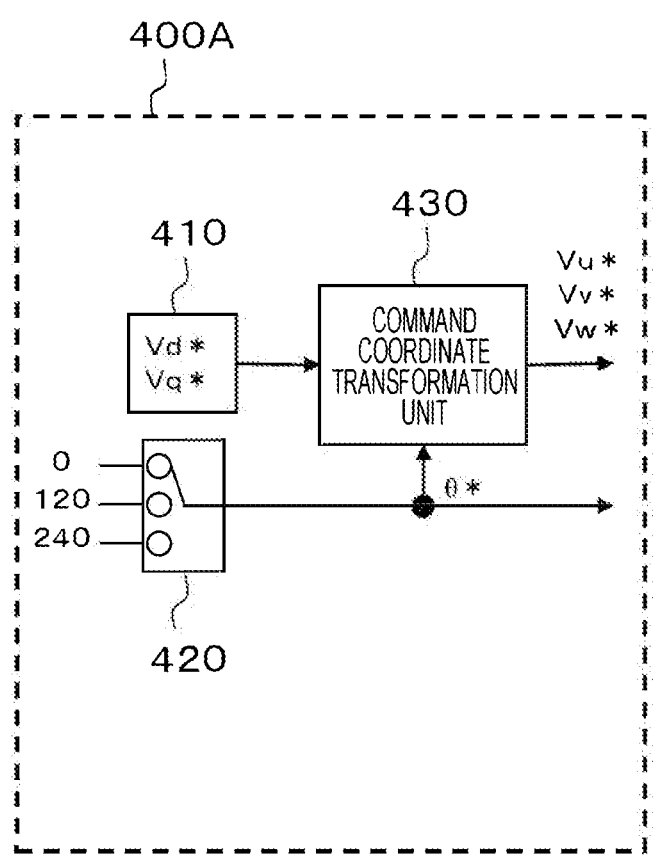
FIG. 2 is a detailed configuration diagram of a voltage pulse preparing unit according to the first embodiment.

FIG. 2 is a detailed configuration diagram of the voltage pulse preparing unit 400A according to the first embodiment. Further, this configuration diagram illustrates a configuration in a case where the initial magnetic pole position θest is estimated while the synchronous motor 200 is stopped. Since a configuration in a case where the voltage commands Vu*, Vv*, and Vw* are generated in response to the torque command T* during driving of the synchronous motor 200 is well known, the description thereof is omitted in this embodiment.

The voltage pulse preparing unit 400A includes a voltage command preparing unit 410, a phase switch 420, and a command coordinate transformation unit 430.

The voltage command preparing unit 410 outputs a d-axis voltage command Vd* and a q-axis voltage command Vq*. In this embodiment, the d-axis voltage command Vd* to alternate positive and negative voltages shown in FIG. 3B to be described below are generated, and the q-axis voltage command Vq* is zero.

The phase switch 420 prepares the phase command θ* for converting the d-axis voltage command Vd* and the q-axis voltage command Vq* prepared by the voltage command preparing unit 410 into three-phase voltage commands. The phase switch 420 sequentially outputs 0 degrees (0 radians), 120 degrees (2/3π radians), and 240 degrees (4/3π radians) as the phase command θ*.

The command coordinate transformation unit 430 receives, as inputs, the d-axis voltage command Vd* and the q-axis voltage command Vq* prepared by the voltage command preparing unit 410 and the phase command θ* output from the phase switch 420 and performs coordinate transformation on these commands into three-phase voltage commands Vu*, Vv*, and Vw*. The coordinate transformation is performed according to the following expressions (1), (2), and (3).

$$Vu^* = Vd^* \times \cos(\theta^*) - Vq^* \times \sin(\theta^*) \tag{1}$$

$$Vv^* = Vd^* \times \cos(\theta^* - 2\pi/3) - Vq^* \times \sin(\theta^* - 2\pi/3) \tag{2}$$

$$Vw^* = Vd^* \times \cos(\theta^* - 4\pi/3) - Vq^* \times \sin(\theta^* - 4\pi/3) \tag{3}$$

Figure 3:
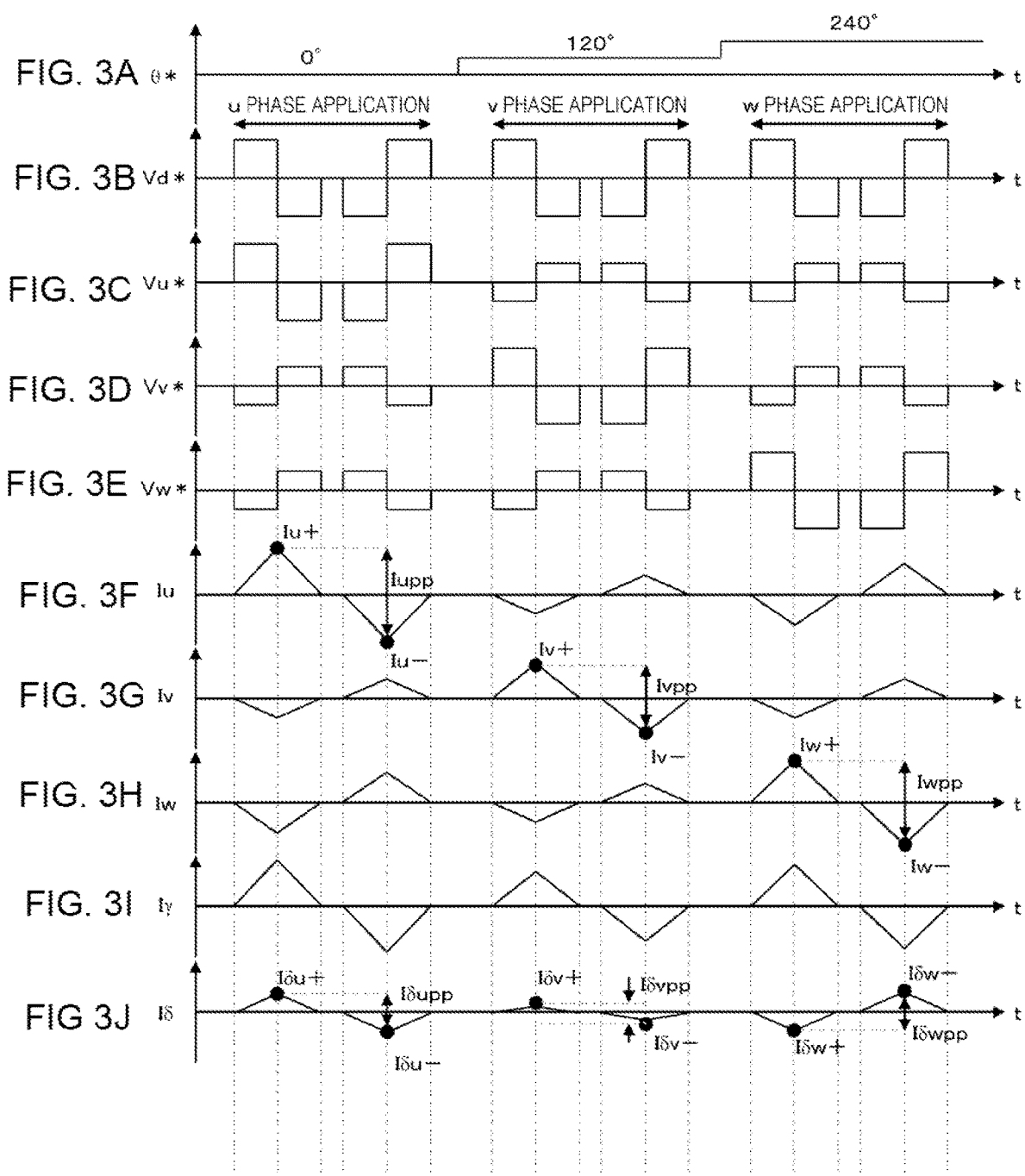
FIGS. 3A to 3J are diagrams illustrating a relationship between a phase command, a voltage command, and a current flowing to a synchronous motor in the first embodiment.

FIG. 3 is a diagram illustrating a relationship between the phase command θ*, the voltage command, and a current flowing to the synchronous motor 200 in the first embodiment. FIG. 3(A) illustrates the phase command θ* output from the phase switch 420, and FIG. 3(B) illustrates the d-axis voltage command Vd* prepared by the voltage command preparing unit 410. Further, as described above, the q-axis voltage command Vq* is zero. FIGS. 3(C) to 3(E) illustrate three-phase voltage commands Vu*, Vv*, and Vw* output from the command coordinate transformation unit 430, respectively. FIGS. 3(F) to 3(H) illustrate three-phase currents Iu, Iv, and Iw detected by the current detecting unit 500 and input to the magnetic pole position estimating unit 600A, respectively.

As illustrated in FIG. 3(A), the phase command θ* is output from the phase switch 420 in an order of 0 degrees (0 radians), 120 degrees (2/3π radians), and 240 degrees (4/3π radians). As illustrated in FIGS. 3(C) to 3(E), the three-phase voltage commands Vu*, Vv*, and Vw*, which are outputs of the command coordinate transformation unit 430, are applied as alternating positive and negative pulse voltages to the u phase when the phase command θ* indicates 0 degrees, to the v phase when the phase command θ* indicates 120 degrees, and to the w phase when the phase command θ* indicates 240 degrees. Consequently, as illustrated in FIGS. 3(F) to 3(H), the three-phase currents Iu, Iv, and Iw flow to the synchronous motor 200.

Figure 5:
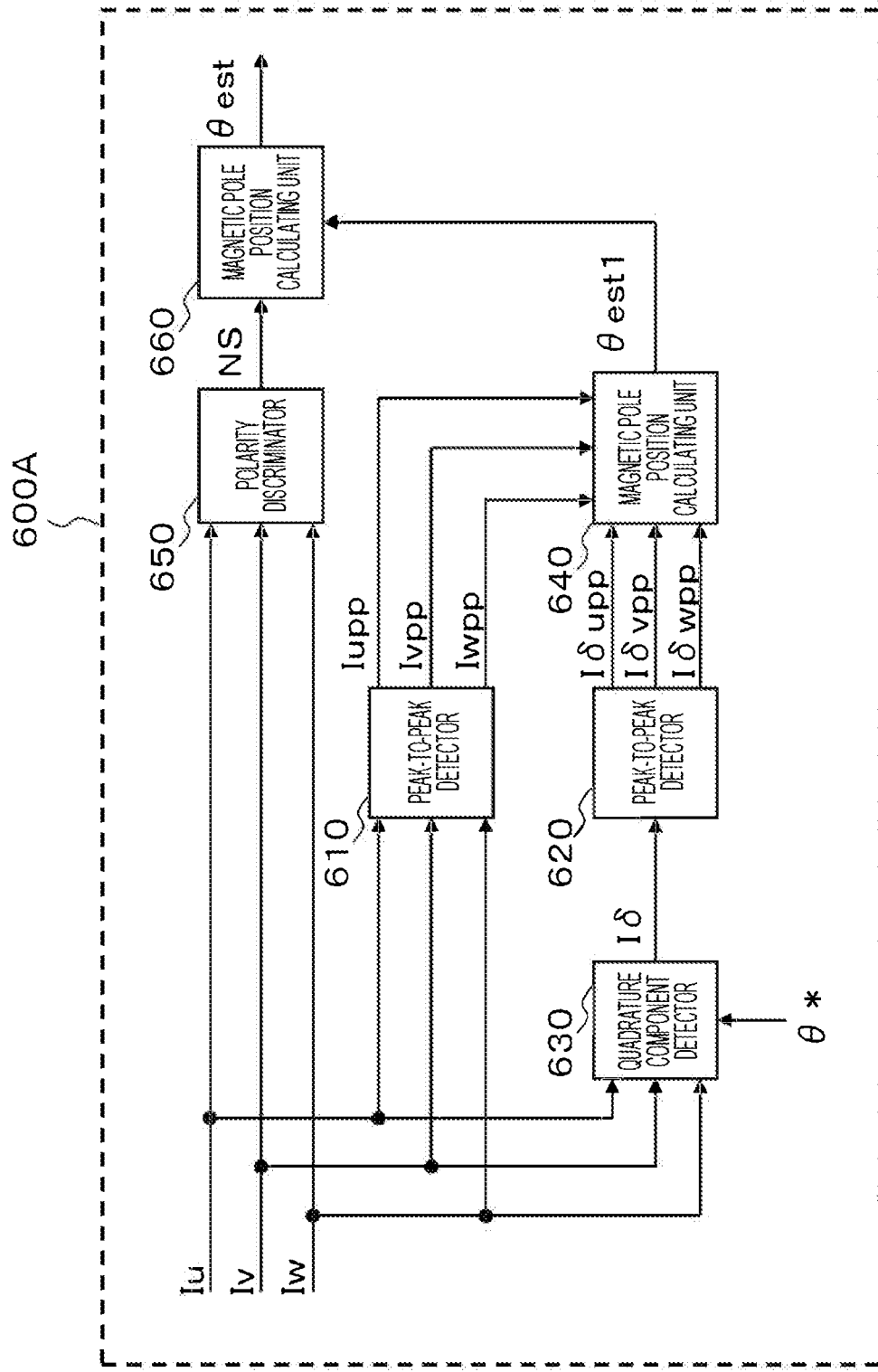
FIG. 5 is a detailed configuration diagram of a magnetic pole position estimating unit according to the first embodiment.

FIG. 5 is a detailed configuration diagram of the magnetic pole position estimating unit 600A according to the first embodiment.

The magnetic pole position estimating unit 600A includes a first peak-to-peak detector 610, a second peak-to-peak detector 620, a quadrature component detector 630, a first magnetic pole position calculating unit 640, a polarity discriminator 650, and a second magnetic pole position calculating unit 660.

The first peak-to-peak detector 610 receives, as inputs, the current values Iu, Iv, and Iw detected by the current detecting unit 500 and detects peak-to-peak values Iupp, Ivpp, and Iwpp representing differences between maximum values and minimum values of phase currents.

In FIG. 3(F), the peak-to-peak value Iupp of the u phase current is a difference between a maximum value Iu+ of the u phase current when a positive voltage is applied to the u phase with the phase command θ* of 0 degrees and a minimum value Iu− of the u phase current when a negative voltage is applied to the u phase with the phase command θ* of 0 degrees.

In FIG. 3(G), the peak-to-peak value Ivpp of the v phase current is a difference between a maximum value Iv+ of the v phase current when a positive voltage is applied to the v phase with the phase command θ* of 120 degrees and a minimum value Iv− of the v phase current when a negative voltage is applied to the v phase with the phase command θ* of 120 degrees.

In FIG. 3(H), the peak-to-peak value Iwpp of the w phase current is a difference between a maximum value Iw+ of the w phase current when a positive voltage is applied to the w phase with the phase command θ* of 240 degrees and a minimum value Iw− of the w phase current when a negative voltage is applied to the w phase with the phase command θ* of 240 degrees.

As illustrated in FIGS. 3(F) to 3(H), Iupp, Ivpp, and Iwpp represent the peak-to-peak values of the phase currents. In general, a permanent magnet synchronous motor used for driving an electric motor vehicle such as an electric vehicle has saliency (rotor position dependency of inductance), and the inductance changes depending on a rotor position. Therefore, the peak-to-peak values Iupp, Ivpp, and Iwpp of the phase currents obtained while the synchronous motor 200 is stopped also change depending on the initial magnetic pole position θest. In addition, it is known that a change in current (change in inductance) due to saliency appears in a cycle of ½ times the rotor position. Using these, the initial magnetic pole position θest can be calculated from Iupp, Ivpp, and Iwpp.

However, depending on the initial magnetic pole position, not only a change in current due to saliency but also a change in current due to magnetic saturation may be included in the peak-to-peak values Iupp, Ivpp, and Iwpp of the phase currents. This will be described below with reference to FIG. 4.

Figure 4:
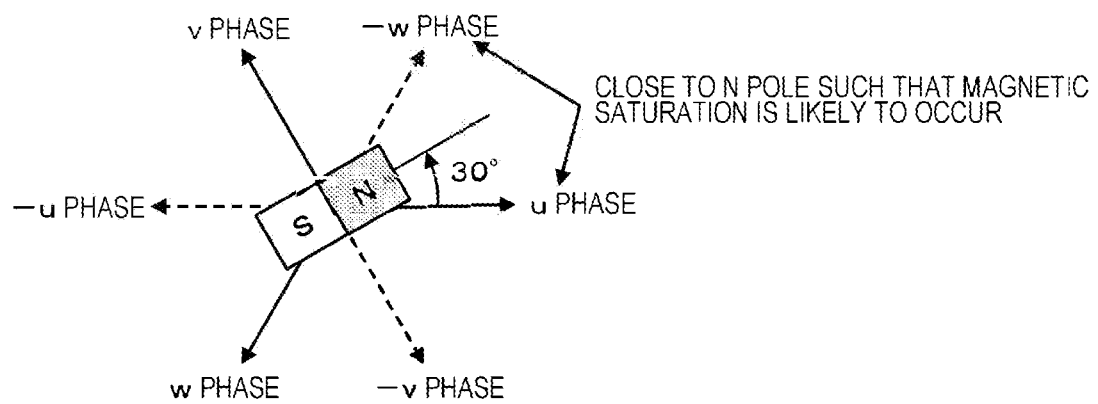
FIG. 4 is a diagram for describing an influence of magnetic saturation.

For example, as illustrated in FIG. 4, when the initial magnetic pole position is at 30 degrees in the synchronous motor 200, an N pole of a magnet which is the rotor is located at a position close to the +u phase and the −w phase. In this state, it is assumed that the voltage commands Vu*, Vv*, and Vw* illustrated in FIGS. 3(C) to 3(E) are output from the voltage pulse preparing unit 400A, and the voltages Vu, Vv, and Vw in response to these voltage commands are applied from the power converter 300 to the synchronous motor 200. In this case, a magnetic flux of the magnet is superimposed on a magnetic flux generated by the current in a period in which a positive voltage is applied to the u phase in a u phase application zone which is a zone having the phase command θ* of 0 degrees and a period in which a negative voltage is applied to the w phase in a w phase application zone which is a zone having the phase command θ* of 240 degrees. Therefore, an overdense magnetic flux occurs in a stator of the synchronous motor 200. As a result, magnetic saturation occurs, and the inductance decreases. Hence, as represented by Iu+ in FIG. 3(F) and Iw− in FIG. 3(H), each current change may be larger than that in a case where magnetic saturation does not occur.

As described above, depending on the initial magnetic pole position, regarding the peak-to-peak values Iupp, Ivpp, and Iwpp of the phase currents, not only a change in current due to saliency but also a change in current due to magnetic saturation may occur. This causes an increase in estimation error of the initial magnetic pole position θest in the magnetic pole position estimating unit 600A.

Moreover, a surface permanent magnet synchronous motor having no saliency is often used for a permanent magnet synchronous motor used for driving a brake system of an electrified vehicle or an electric power steering device. Since the surface permanent magnet synchronous motor does not have saliency, the magnetic pole position estimating unit 600A cannot calculate the initial magnetic pole position by using a current change due to the saliency as described above. In a case where the synchronous motor 200 is the surface permanent magnet synchronous motor, an estimation error becomes large, when the initial magnetic pole position θest is estimated from changes in the peak-to-peak values Iupp, Ivpp, and Iwpp of the phase currents.

Therefore, in this embodiment, the quadrature component detector 630 and the second peak-to-peak detector 620 are provided in the magnetic pole position estimating unit 600A. As will be described below, the first magnetic pole position calculating unit 640 calculates a first magnetic pole position θest1 based on the peak-to-peak values Iupp, Ivpp, and Iwpp of the phase currents output from the first peak-to-peak detector 610 and peak-to-peak values Iδupp, Iδvpp, and Iδwpp of quadrature components of the phase currents output from the second peak-to-peak detector 620. The initial magnetic pole position θest is estimated based on the first magnetic pole position θest1 obtained as described above.

The quadrature component detector 630 receives, as inputs, the current values Iu, Iv, and Iw detected by the current detecting unit 500 and the phase command θ* and detects quadrature components for the phase currents based on these values and command. Here, quadrature biaxial components Iγ and Iδ are calculated from the current values Iu, Iv, and Iw and the phase command θ* according to the following expressions (4) and (5), and thereby quadrature components for the phase currents are obtained.

$$I\gamma = \tfrac{2}{3} \times \{Iu \times \cos(\theta^*) + Iv \times \cos(\theta^* - 2\pi/3) + Iw \times \cos(\theta^* - 4\pi/3)\} \quad (4)$$

$$I\delta = -\tfrac{2}{3} \times \{Iu \times \sin(\theta^*) + Iv \times \sin(\theta^* - 2\pi/3) + Iw \times \sin(\theta^* - 4\pi/3)\} \quad (5)$$

After calculating the quadrature biaxial components Iγ and Iδ, the quadrature component detector 630 outputs Iδ of the components to the second peak-to-peak detector 620.

The second peak-to-peak detector 620 receives, as input, the quadrature components Iδ of the phase currents calculated by the quadrature component detector 630 and detects the peak-to-peak values Iδupp, Iδvpp, and Iδwpp representing differences between maximum values and minimum values of the quadrature component IS.

The peak-to-peak value Iδupp is a difference between the maximum value and the minimum value of the quadrature component Iδ when the phase command θ* indicates 0 degrees. This corresponds to a difference between a peak value Iδu+ of Iδ when the positive voltage is applied to the u phase with the phase command θ* of 0 degrees and a peak value Iδu− of Iδ when the negative voltage is applied to the u phase with the phase command θ* of 0 degrees in FIG. 3(J).

The peak-to-peak value Iδvpp is a difference between the maximum value and the minimum value of the quadrature component Iδ when the phase command θ* indicates 120 degrees. This corresponds to a difference between a peak value Iδv+ of Iδ when the positive voltage is applied to the v phase with the phase command θ* of 120 degrees and a peak value Iδv− of Iδ when the negative voltage is applied to the v phase with the phase command θ* of 120 degrees in FIG. 3(J).

The peak-to-peak value Iδwpp is a difference between the maximum value and the minimum value of the quadrature component Iδ when the phase command θ* indicates 240 degrees. This corresponds to a difference between a peak value Iδw+ of Iδ when the positive voltage is applied to the w phase with the phase command θ* of 240 degrees and a peak value Iδw− of Iδ when the negative voltage is applied to the w phase with the phase command θ* of 240 degrees in FIG. 3(J).

The first magnetic pole position calculating unit 640 receives, as inputs, the peak-to-peak values Iupp, Ivpp, and Iwpp of the phase currents, which are the outputs of the first peak-to-peak detector 610, and the peak-to-peak values Iδupp, Iδvpp, and Iδwpp of the quadrature component Iδ, which are the outputs of the second peak-to-peak detector 620, and calculates the first magnetic pole position θest1 based on these values.

The peak-to-peak values Iδupp, Iδvpp, and Iδwpp of the quadrature component Iδ are components electrically orthogonal to the peak-to-peak values Iupp, Ivpp, and Iwpp of the phase currents. Hence, even when the inductance of the synchronous motor 200 decreases due to the influence of the above-described magnetic saturation and the peak-to-peak values Iupp, Ivpp, and Iwpp of the phase currents increase according to the decrease in inductance, magnetic saturation does not occur in these quadrature components Iδ, and thus the peak-to-peak values Iδupp, Iδvpp, and Iδwpp of Iδ decrease. On the other hand, when the peak-to-peak values Iδupp, Iδvpp, and Iδwpp of Iδ increase under the influence of magnetic saturation, the peak-to-peak values Iupp, Ivpp, and Iwpp of the phase currents decrease. As described above, the peak-to-peak values Iupp, Ivpp, and Iwpp of the phase currents and the peak-to-peak values Iδupp, Iδvpp, and Iδwpp of the quadrature components Iδ have characteristics that are opposite to each other.

In this embodiment, the first magnetic pole position calculating unit 640 performs quadrature biaxial component averaging processing to be described below using the above characteristics, thereby, canceling changes in the peak-to-peak values Iupp, Ivpp, and Iwpp of the phase currents due to the influence of magnetic saturation. As a result, only a change in current due to saliency can be extracted.

In addition, when the synchronous motor 200 is the surface permanent magnet synchronous motor, since the synchronous motor 200 does not have saliency, the quadrature components Iδ are originally constant, and the peak-to-peak values Iδupp, Iδvpp, and Iδwpp of Iδ are all 0. However, when the magnetic saturation according to the initial magnetic pole position occurs in the synchronous motor 200 as described above, the inductance in a magnetic flux direction of the permanent magnet or a direction orthogonal thereto changes, and thus, the peak-to-peak values Iδupp, Iδvpp, and Iδwpp of the quadrature components Iδ are generated. In this embodiment, the characteristics of the peak-to-peak values Iδupp, Iδvpp, and Iδwpp of the quadrature components Iδ can be used to estimate the initial magnetic pole position θest even when the synchronous motor 200 is the surface permanent magnet synchronous motor.

Figure 6:
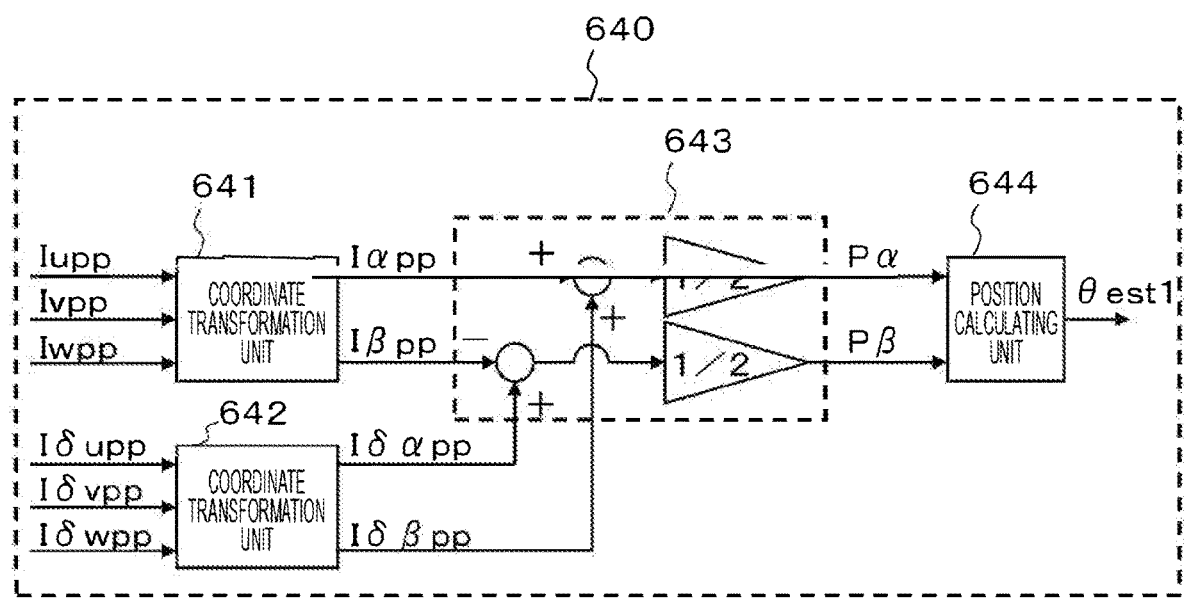
FIG. 6 is a configuration diagram illustrating main functions of a first magnetic pole position calculating unit.

FIG. 6 is a configuration diagram illustrating main functions of the first magnetic pole position calculating unit 640. The first magnetic pole position calculating unit 640 includes a first coordinate transformation unit 641, a second coordinate transformation unit 642, a quadrature biaxial component averaging processing unit 643, and a position calculating unit 644.

The first coordinate transformation unit 641 receives, as inputs, the peak-to-peak values Iupp, Ivpp, and Iwpp of the phase currents, which are outputs of the first peak-to-peak detector 610, and transforms coordinate systems thereof into an αβ coordinate system to output Iαpp and Iβpp. Here, the transformation into the αβ coordinate system is performed by the following expressions (6) and (7).

$$I\alpha pp = \tfrac{2}{3} \times \{Iupp - \tfrac{1}{2} \times Ivpp - \tfrac{1}{2} \times Iwpp\} \tag{6}$$

$$I\beta pp = \tfrac{2}{3} \times \{(\sqrt{3}/2) \times (Ivpp - Iwpp)\} \tag{7}$$

The second coordinate transformation unit 642 receives, as inputs, the peak-to-peak values Iδupp, Iδvpp, and Iδwpp of the quadrature components Iδ, which are outputs of the second peak-to-peak detector 620, and transforms coordinate systems thereof into an αβ coordinate system to output Iδαpp and Iδβpp. Here, the transformation into the αβ coordinate system is performed by the following expressions (8) and (9).

$$I\delta\alpha pp = \tfrac{2}{3} \times \{I\delta upp - \tfrac{1}{2} \times I\delta vpp - \tfrac{1}{2} \times I\delta wpp\} \tag{8}$$

$$I\delta\beta pp = \tfrac{2}{3} \times \{(\sqrt{3}/2) \times (I\delta vpp - I\delta wpp)\} \tag{9}$$

The quadrature biaxial component averaging processing unit 643 receives, as inputs, Iαpp and Iβpp which are outputs of the first coordinate transformation unit 641 and Iδαpp and Iδβpp which are outputs of the second coordinate transformation unit 642 and performs quadrature biaxial component averaging processing on these outputs to output Pα and Pβ.

The quadrature biaxial component averaging processing unit 643 calculates Pα and Pβ, according to the following expressions (10) and (11). Here, Pα is obtained by dividing the sum of Iαpp and Iδβpp by 2, and Pβ is obtained by dividing a difference between Iδαpp and Iβpp by 2.

$$P\alpha = \tfrac{1}{2} \times (I\alpha pp + I\delta\beta pp) \tag{10}$$

$$P\beta = \tfrac{1}{2} \times (I\delta\alpha pp - I\beta pp) \tag{11}$$

Figure 7A:
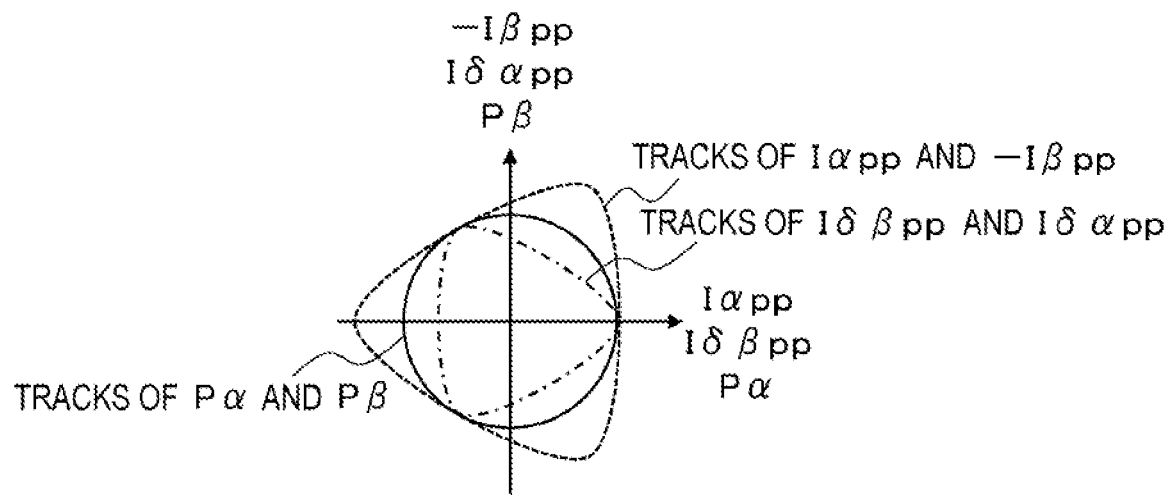
FIGS. 7A and 7B are diagrams for describing a principle of improving estimation accuracy of an initial magnetic pole position.

Here, a principle of improving the estimation accuracy of the initial magnetic pole position by the quadrature biaxial component averaging processing for the interior permanent magnet synchronous motor and the surface permanent magnet synchronous motor will be described below with reference to FIG. 7.

Iαpp and Iβpp which are outputs of the first coordinate transformation unit 641, Iδαpp and Iδβpp which are the outputs of the second coordinate transformation unit 642, and Pα and Pβ, which are the outputs of the quadrature biaxial component averaging processing unit 643 change depending on the initial magnetic pole position in a certain relationship for each of combinations thereof. FIG. 7 is a diagram illustrating a track of changes of these combinations with respect to the initial magnetic pole position. In FIG. 7, a track of Iαpp and Iβpp is illustrated to have Iαpp on the horizontal axis and —Iδβpp on the vertical axis. In addition, a track of Iδαpp and Iδβpp is illustrated to have Iδβpp on the horizontal axis and Iδαpp on the vertical axis. In addition, a track of Pα and Pβ, is illustrated to have Pα on the horizontal axis and Pβ, on the vertical axis. However, these tracks are rotated in a cycle of ½ times the initial magnetic pole position. Therefore, in FIG. 7, for example, a point on the vertical axis which is a boundary between a first quadrant and a second quadrant corresponds to an initial magnetic pole position at 45 degrees or 225 degrees.

Here, the initial magnetic pole position of the synchronous motor 200 corresponds to a value obtained by inputting a horizontal axis component and a vertical axis component of each track illustrated in FIG. 7 to an arctangent function. That is, as these tracks are closer to a circular shape, the initial magnetic pole position can be obtained with higher accuracy.

FIG. 7(*a*) illustrates an example of the track of the combinations in a case where the synchronous motor 200 is the interior permanent magnet synchronous motor. As described above, when magnetic saturation occurs in the synchronous motor 200, the inductance decreases, and thus each phase current increases. As a result, as shown in FIG. 7(*a*), the track of Iαpp and Iβpp is not circular and forms a shape in which the initial magnetic pole position bulges around 30 degrees, 90 degrees, 150 degrees, 210 degrees, 270 degrees, and 330 degrees. On the other hand, since the magnetic saturation does not occur in a direction orthogonal to each phase current, the track of Iδαpp and Iδβpp becomes smaller than the track of Iαpp and Iβpp.

By using this, the track of Pα and Pβ corresponding to an intermediate track between the track of Iαpp and Iβpp and the track of Iδαpp and Iδβpp is obtained, and thereby a circular track is obtained as illustrated in FIG. 7(*a*). That is, even when the magnetic saturation occurs in the interior permanent magnet synchronous motor, and thus the peakto-peak values Iupp, Ivpp, and Iwpp of the phase currents increase, Pα and Pβ, excluding the influence of magnetic saturation can be obtained. Hence, it can be found that the initial magnetic pole position can be obtained with high accuracy based on Pα and Pβ.

Figure 7B:
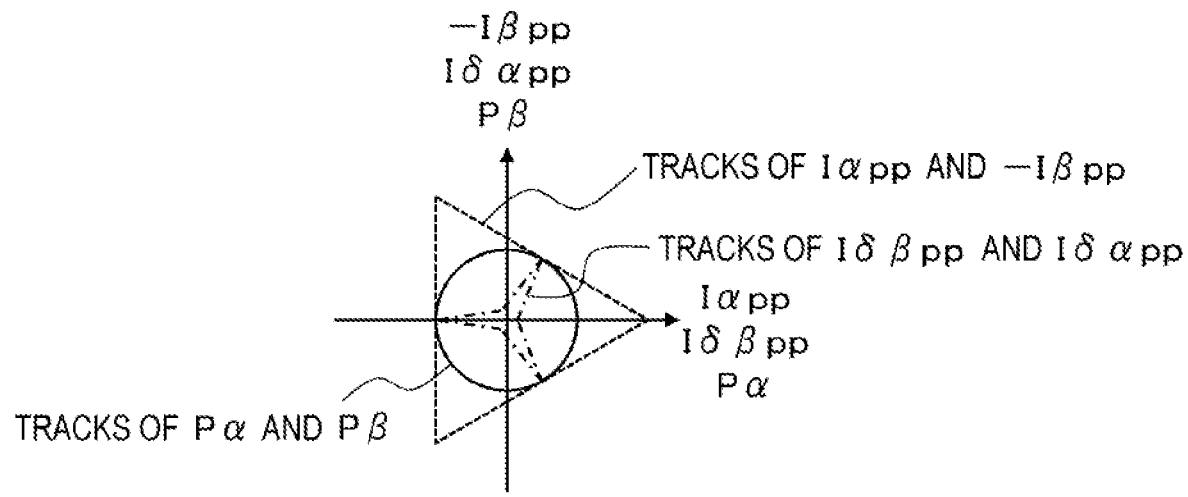

FIG. 7(b) illustrates an example of a track of the combinations in a case where the synchronous motor 200 is the surface permanent magnet synchronous motor. In the case of the surface permanent magnet synchronous motor having no saliency, Iδαpp and Iδβpp are originally zero, but Iδαpp and Iδβpp are generated when the inductance changes due to the occurrence of the magnetic saturation. The track of Iδαpp and Iδβpp at this time has characteristics opposite to the track of Iαpp and Iβpp, similarly to the case of the interior permanent magnet synchronous motor illustrated in FIG. 7(a).

By using this, the track of Pα and Pβ, corresponding to an intermediate track between the track of Iαpp and Iβpp and the track of Iδαpp and Iδβpp is obtained, and thereby a circular track is obtained as illustrated in FIG. 7(b). Consequently, it can be found that the initial magnetic pole position can be obtained with high accuracy based on Pα and Pβ, even when the synchronous motor 200 does not have saliency or has minute saliency.

As described above, in this embodiment, the quadrature biaxial component averaging processing unit 643 included in the first magnetic pole position calculating unit 640 calculates Pα and Pβ, excluding the influence of the magnetic saturation. The position calculating unit 644 calculates the first magnetic pole position θest1 using Pα and Pβ. Hence, even when the synchronous motor 200 is the interior permanent magnet synchronous motor or the surface permanent magnet synchronous motor, it is possible to improve the estimation accuracy of the initial magnetic pole position.

The position calculating unit 644 receives, as inputs, Pα and Pβ, which are outputs of the quadrature biaxial component averaging processing unit 643, and calculates the first magnetic pole position θest1 based on Pα and Pβ. The first magnetic pole position θest1 is obtained according to the following expression (12).

$$\theta est1 = \frac{1}{2} \times \{\arctan(P\beta/P\alpha)\} \quad (12)$$

In general, it is known that a change in inductance due to the saliency in the synchronous motor 200 appears in a cycle of ½ times a rotation angle. That is, in an estimation method using the saliency, the initial magnetic pole position can be estimated only in the range of 0 to 180 degrees, and it is not possible to determine whether polarity of a magnet of a rotor is an N pole or an S pole. Therefore, as illustrated in FIG. 5, the magnetic pole position estimating unit 600A of this embodiment includes a polarity discriminator 650 to discriminate polarity of a magnet of a rotor.

Figure 8:
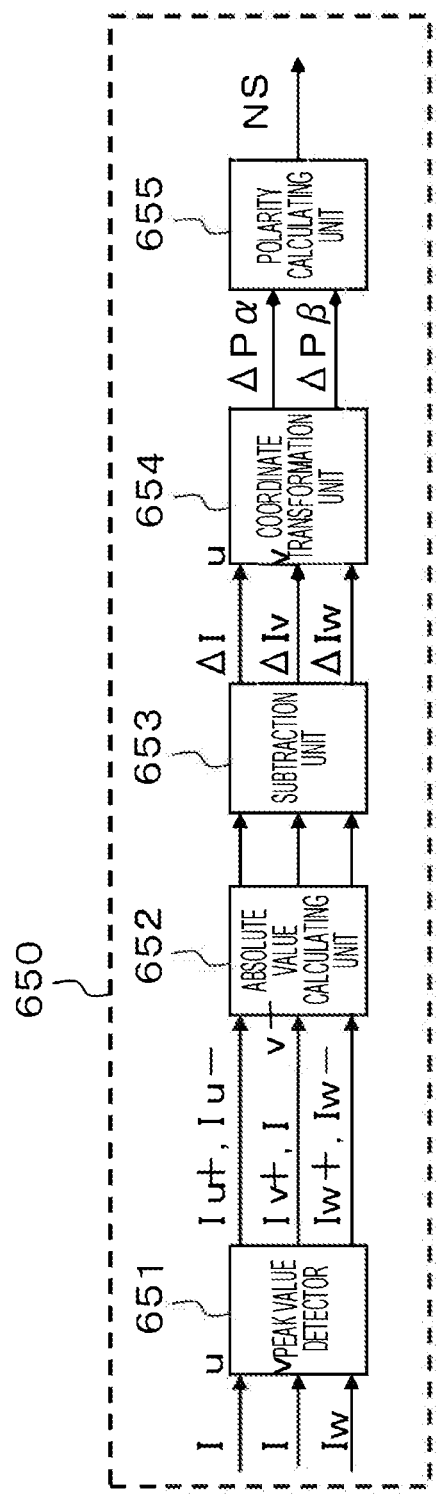
FIG. 8 is a configuration diagram illustrating main functions of a polarity discriminator.

FIG. 8 is a configuration diagram illustrating main functions of the polarity discriminator 650. The polarity discriminator 650 according to this embodiment includes a peak value detector 651, an absolute value calculating unit 652, a subtraction unit 653, a coordinate transformation unit 654, and a polarity calculating unit 655.

The peak value detector 651 receives, as inputs, the phase currents Iu, Iv, and Iw detected by the current detecting unit 500 and detects peak values Iu+, Iu−, Iv+, Iv−, Iw+, and Iw− of the phase currents.

The current peak value Iu+ is the maximum value of the u phase current when the positive voltage is applied to the u phase with the phase command θ* of 0 degrees in FIG. 3(F). The current peak value Iu− is the minimum value of the u phase current when the negative voltage is applied to the u phase with the phase command θ* of 0 degrees in FIG. 3(F).

The current peak value Iv+ is the maximum value of the v phase current when the positive voltage is applied to the v phase with the phase command θ* of 120 degrees in FIG. 3(G). The current peak value Iv− is the minimum value of the v phase current when the negative voltage is applied to the v phase with the phase command θ* of 120 degrees in FIG. 3(G).

The current peak value Iw+ is the maximum value of the w phase current when the positive voltage is applied to the w phase with the phase command θ* of 240 degrees in FIG. 3(H). The current peak value Iw− is the minimum value of the w phase current when the negative voltage is applied to the w phase with the phase command θ* of 240 degrees in FIG. 3(H).

The absolute value calculating unit 652 receives, as inputs, the current peak values Iu+, Iu−, Iv+, Iv−, Iw+, and Iw− of the phases and calculates the respective absolute values.

The subtraction unit 653 calculates differences between the absolute values of the current peak values of the phases according to the following expressions (13), (14), and (15) and outputs ΔIu, ΔIv, and ΔIw.

$$\Delta Iu = |Iu+| - |Iu-| \quad (13)$$

$$\Delta Iv = |Iv+| - |Iw-| \quad (14)$$

$$\Delta Iw = |Iw+| - |Iv-| \quad (15)$$

Since ΔIu, ΔIv, and ΔIw are the differences between the absolute values of the current values obtained when the positive voltage is applied and the current values obtained when the negative voltage is applied, ΔIu, ΔIv, and ΔIw are values indicating a degree of the magnetic saturation of the synchronous motor 200.

The coordinate transformation unit 654 converts ΔIu, ΔIv, and ΔIw, which are the differences between the absolute values of the current peak values of the phases, using the following expressions (16) and (17), and outputs results as ΔPα and ΔPβ.

$$\Delta P\alpha = \frac{2}{3} \times \{\Delta Iu - \frac{1}{2} \times \Delta Iv - \frac{1}{2} \times \Delta Iw\} \quad (16)$$

$$\Delta P\beta = \frac{2}{3} \times \{(\sqrt{3}/2) \times (\Delta Iv - \Delta Iw)\} \quad (17)$$

Polarity calculating unit 655 receives ΔPα and ΔPβ as inputs and discriminates whether the polarity of the magnet is the N pole or the S pole based on second magnetic pole position θest2 obtained by the following expression (18).

$$\theta est2 = \arctan\{\Delta P\beta/\Delta P\alpha\} \quad (18)$$

Here, ΔPα and ΔPβ are values obtained from ΔIu, ΔIv, and ΔIw, which are differences in absolute values of the current peak values Iu+, Iu−, Iv+, Iv−, Iw+, and Iw− of the phases. When the synchronous motor 200 is magnetically saturated, the absolute values of the current peak values in a direction in which magnetic saturation occurs increase, and thus the differences ΔIu, ΔIv, and ΔIw between the absolute values of the current peak values of the phases indicate degrees of the magnetic saturation.

Since the degree of the magnetic saturation does not always appear in a sinusoidal shape, the magnetic pole position can be estimated in a range of 0 to 360 degrees (that is, including the polarity of the magnet of the rotor) in both the interior permanent magnet synchronous motor and the surface permanent magnet synchronous motor although the accuracy is not high. Using this, the polarity discriminator 650 discriminates the polarity of the second magnetic pole position θest2 obtained from the degree of the magnetic saturation and outputs the discrimination result as polarity NS. For example, when θest2 is within a predetermined range, the polarity is determined as the N pole, and when θest2 is out of the predetermined range, the polarity is determined as the S pole. Here, the predetermined range is, for example, a range in which θest2 is 0 to 180 degrees. Specifically, when θest2 is 0 to 180 degrees, the polarity is determined as the N pole, and when θest2 is 180 to 360 degrees, the polarity is determined as the S pole.

Returning to the description of FIG. 5, the second magnetic pole position calculating unit 660 calculates a rotor position of the synchronous motor 200 based on the first magnetic pole position θest1 calculated by the first magnetic pole position calculating unit 640 and the polarity NS discriminated by calculating the second magnetic pole position θest2 by the polarity discriminator 650.

Although the first magnetic pole position θest1 can be obtained only in the range of 0 to 180 degrees, the second magnetic pole position calculating unit 660 estimates the initial magnetic pole position θest using the polarity NS which is a discrimination result by the polarity discriminator 650. Specifically, when the polarity discriminator 650 determines that the polarity NS is the N pole, the first magnetic pole position θest1 is output as it is as the initial magnetic pole position θest. On the other hand, when the polarity discriminator 650 determines that the polarity NS is the S pole, a value obtained by adding 180 degrees to the first magnetic pole position θest1 is output as the initial magnetic pole position θest.

According to this embodiment, the magnetic pole position estimating unit 600A is configured to detect the peak-to-peak values of the phase currents and the peak-to-peak values of the quadrature components of the phase currents when the positive and negative voltages are sequentially applied to the phases of the synchronous motor 200 by the voltage pulse preparing unit 400A while the synchronous motor 200 is stopped. Accordingly, using the detected peak-to-peak values of the phase currents and the detected peak-to-peak values of the quadrature components of the phase currents, a current change caused by the magnetic saturation is eliminated, and a current change caused by the saliency is obtained. In addition, even in a case where the synchronous motor 200 is the surface permanent magnet synchronous motor, a current change is obtained by utilizing the fact that the quadrature components of the phase currents are generated by an inductance change due to the magnetic saturation. Consequently, the initial magnetic pole position of the rotor can be accurately estimated regardless of whether the synchronous motor 200 is the interior permanent magnet type or the surface permanent magnet type. Hence, in this embodiment, it is possible to estimate the initial magnetic pole position with high accuracy while having versatility to be applicable to both the interior permanent magnet synchronous motor and the surface permanent magnet synchronous motor. Therefore, sensorless control of the synchronous motor 200 can also be performed with high accuracy. For example, even in a case where the synchronous motor 200 is used as a driving motor of an electric motor vehicle, the control performance as the vehicle driving motor is improved, and a comfortable ride for an occupant can be provided. In addition, when the synchronous motor 200 is used in an auxiliary device such as an electric power steering device or an electric brake device of an electric motor vehicle, control performance of the auxiliary device is improved, and drivability can be improved.

Second Embodiment

Figure 9:
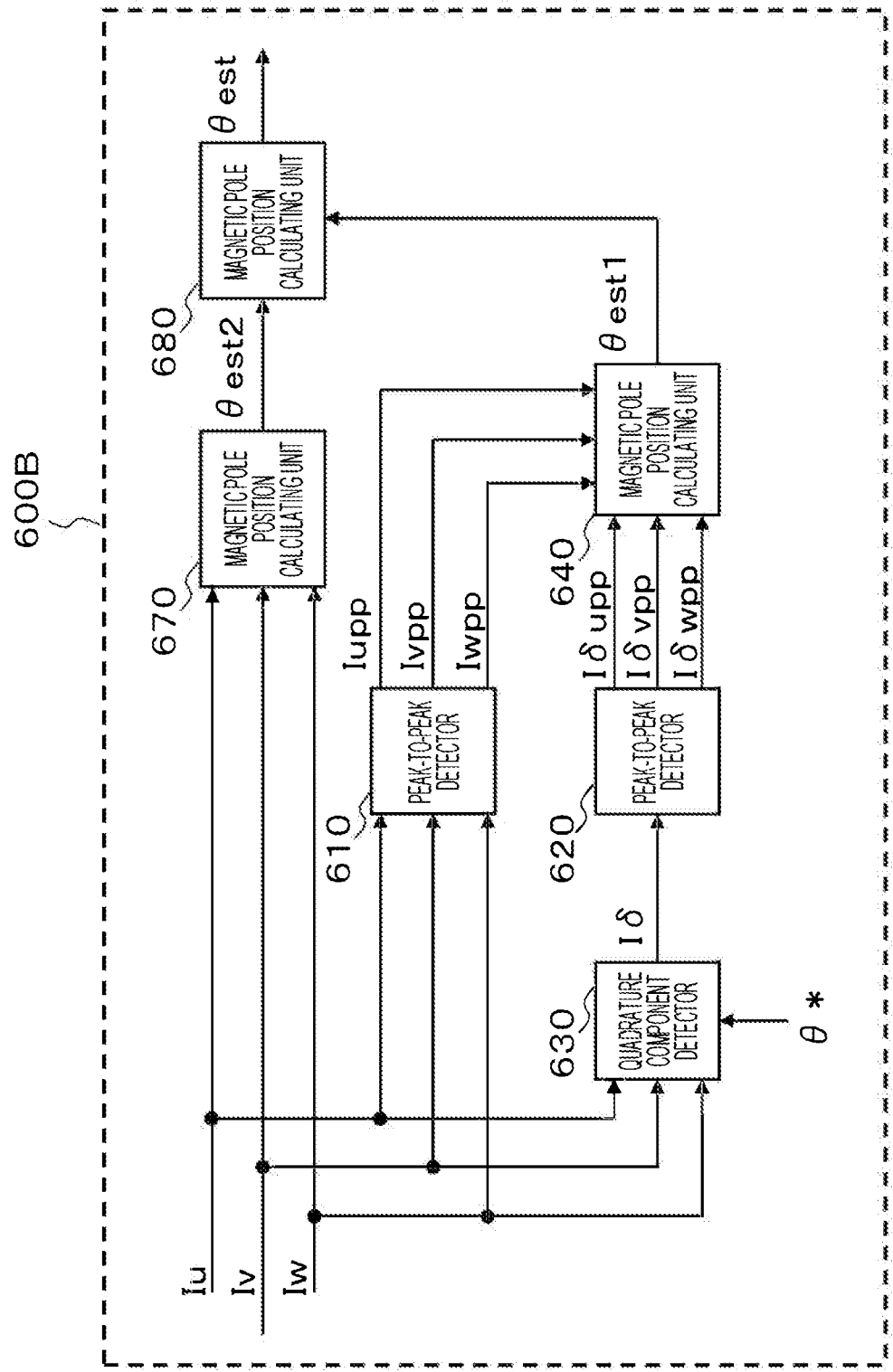
FIG. 9 is a detailed configuration diagram of a magnetic pole position estimating unit according to a second embodiment.

FIG. 9 is a detailed configuration diagram of a magnetic pole position estimating unit 600B according to a second embodiment. The same reference numerals are assigned to the same portions as those of the magnetic pole position estimating unit 600A in the first embodiment, and the description thereof will be omitted. Further, the configuration diagram of the drive apparatus 100A of the synchronous motor 200 illustrated in FIG. 1, the detailed configuration diagram of the voltage pulse preparing unit 400A illustrated in FIG. 2, and the diagram illustrating the relationship between the three-phase voltage commands and the three-phase currents illustrated in FIG. 3 are the same in this embodiment.

In the first embodiment, only the second magnetic pole position θest2 obtained from the differences ΔIu, ΔIv, and ΔIw between the absolute values of the current peak values of the phases is used in the discrimination of the polarity NS performed by the second magnetic pole position calculating unit 660; however, in this embodiment, the polarity NS is obtained from the first magnetic pole position θest1 and the second magnetic pole position θest2.

In this embodiment, as illustrated in FIG. 9, the magnetic pole position estimating unit 600B includes a third magnetic pole position calculating unit 670 and a fourth magnetic pole position calculating unit 680 instead of the polarity discriminator 650 and the second magnetic pole position calculating unit 660. The third magnetic pole position calculating unit 670 calculates the second magnetic pole position θest2 based on the phase currents Iu, Iv, and Iw detected by the current detecting unit 500. The fourth magnetic pole position calculating unit 680 receives, as inputs, both the second magnetic pole position θest2 from the third magnetic pole position calculating unit 670 and the first magnetic pole position θest1 from the first magnetic pole position calculating unit 640. The fourth magnetic pole position calculating unit 680 calculates the initial magnetic pole position θest based on these magnetic pole positions.

Figure 10:
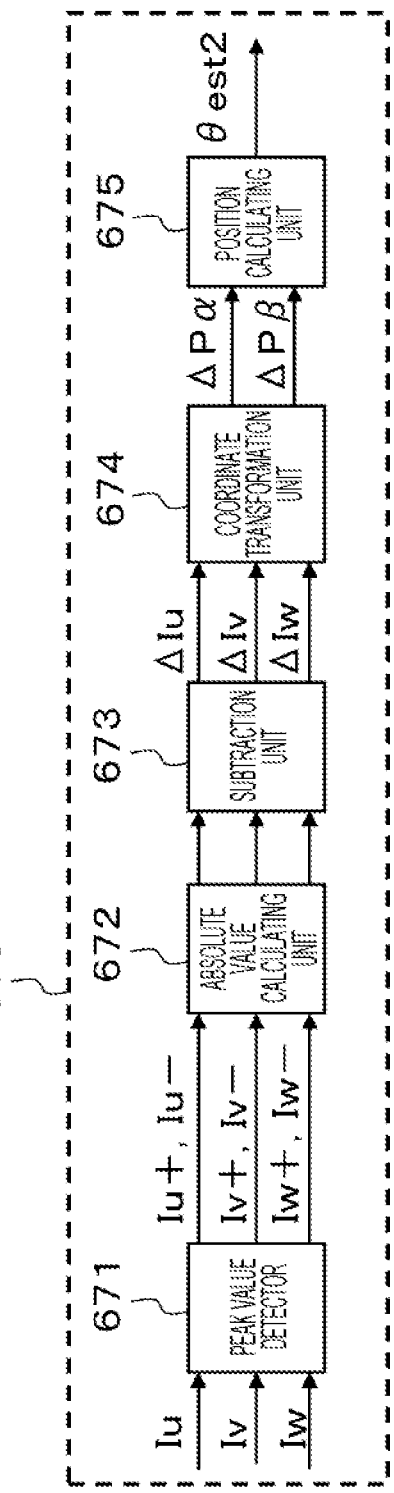
FIG. 10 is a configuration diagram illustrating main functions of a third magnetic pole position calculating unit.

FIG. 10 is a configuration diagram illustrating main functions of the third magnetic pole position calculating unit 670. The third magnetic pole position calculating unit 670 in this embodiment includes a peak value detector 671, an absolute value calculating unit 672, a subtraction unit 673, a coordinate transformation 674, and a position calculating unit 675.

The peak value detector 671, the absolute value calculating unit 672, the subtraction unit 673, and the coordinate transformation 674 perform processes similar to those of the peak value detector 651, the absolute value calculating unit 652, the subtraction unit 653, and the coordinate transformation unit 654 of the polarity discriminator 650 in the first embodiment, respectively.

The position calculating unit 675 receives, as inputs, ΔPα and ΔPβ, output from the coordinate transformation 674 and calculates the second magnetic pole position θest2 according to the above-described expression (18). The third magnetic pole position calculating unit 670 outputs the second magnetic pole position θest2 calculated by the position calculating unit 675 to the fourth magnetic pole position calculating unit 680.

Figure 11:
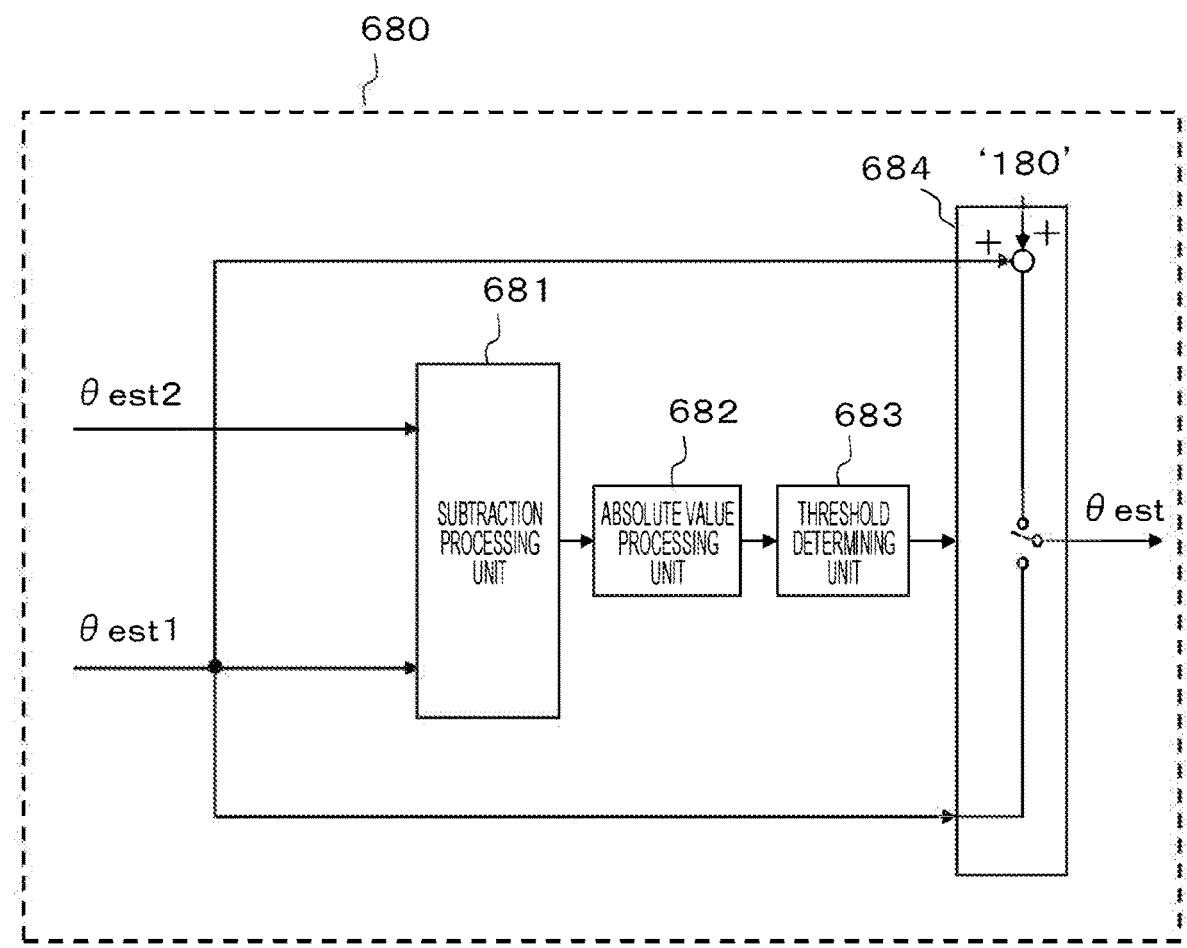
FIG. 11 is a configuration diagram illustrating main functions of a fourth magnetic pole position calculating unit.

FIG. 11 is a configuration diagram illustrating main functions of the fourth magnetic pole position calculating unit 680. The fourth magnetic pole position calculating unit 680 includes a subtraction processing unit 681, an absolute value processing unit 682, a threshold determining unit 683, and an initial magnetic pole position calculating unit 684.

The subtraction processing unit 681 obtains a difference between the first magnetic pole position θest1 and the second magnetic pole position θest2. The absolute value processing unit 682 obtains an absolute value of the difference between the first magnetic pole position θest1 and the second magnetic pole position θest2. Accordingly, the threshold determining unit 683 determines the polarity as the S pole when the absolute value of the difference between the first magnetic pole position θest1 and the second magnetic pole position θest2 is within a predetermined range and determines the polarity as the N pole when the absolute value is out of the predetermined range. Here, the predetermined range may be set reflecting an error of the second magnetic pole position θest2 and is, for example, a range in which the absolute value of the difference between the first magnetic pole position θest1 and the second magnetic pole position θest2 is 90 to 270 degrees.

When the threshold determining unit 683 determines that the polarity is the S pole, the initial magnetic pole position calculating unit 684 outputs a value obtained by adding 180 degrees to the first magnetic pole position θest1 as the initial magnetic pole position θest, and when the threshold determining unit 683 determines that the polarity is the N pole, the initial magnetic pole position calculating unit 684 outputs the first magnetic pole position θest1 as the initial magnetic pole position θest.

Here, as described in the first embodiment, when the polarity NS is discriminated only from the second magnetic pole position θest2, the polarity NS may be erroneously determined because the accuracy of the second magnetic pole position θest2 is low. For example, when the polarity NS is determined as the N pole when the second magnetic pole position θest2 is 0 to 180 degrees, and the polarity NS is determined as the S pole when the second magnetic pole position θest2 is 180 to 360 degrees, the polarity may be wrong when the initial magnetic pole position θest is around 180 degrees or 360 degrees, since there is an error between the actual initial magnetic pole position and the second magnetic pole position θest2.

On the other hand, as described in this embodiment, by discriminating the polarity NS from the first magnetic pole position θest1 and the second magnetic pole position θest2, the error in the second magnetic pole position θest2 can be reflected, so that the initial magnetic pole position θest of the rotor can be estimated without making an error in the polarity NS.

Since the discrimination of the polarity NS described in this embodiment is preferable in that the polarity can be determined during the application of the voltage pulse illustrated in FIG. 3, and thus it is possible to minimize the time required for estimating the initial magnetic pole position θest. However, it is needless to say that the polarity may be determined using a generally known method after the first magnetic pole position θest1 is calculated.

Third Embodiment

Figure 12:
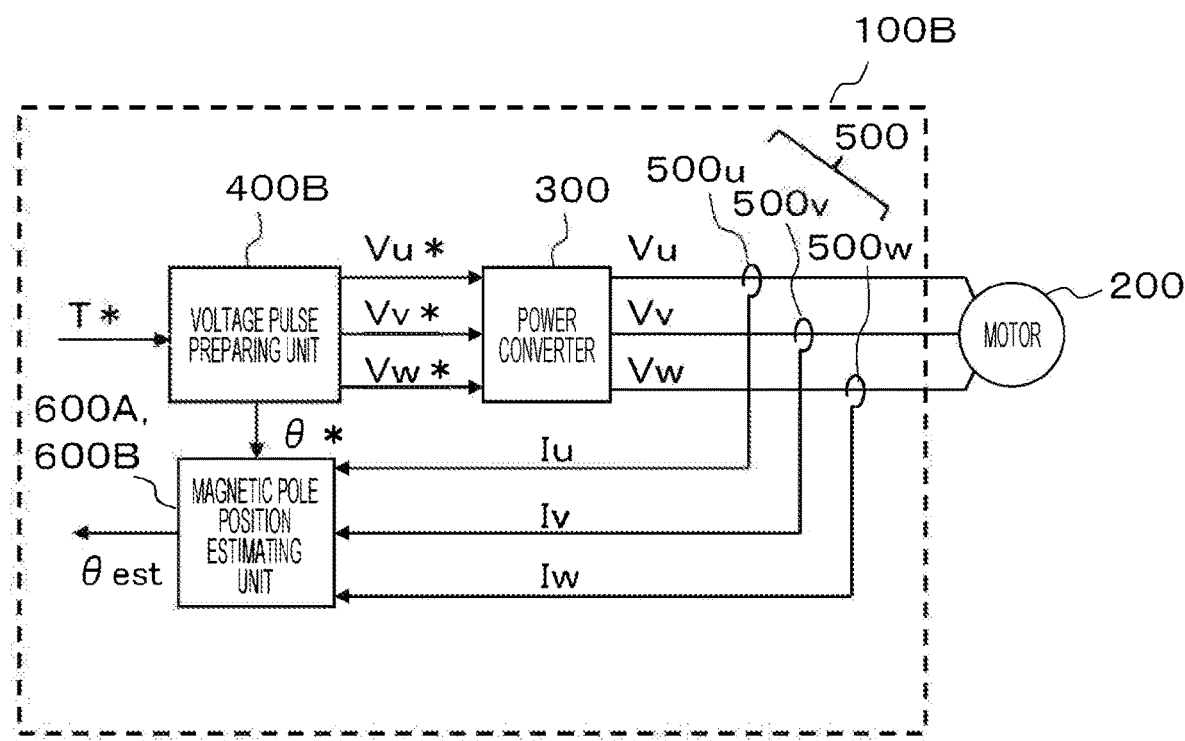
FIG. 12 is a configuration diagram of a drive apparatus according to a third embodiment.

FIG. 12 is a configuration diagram of a drive apparatus 100B according to a third embodiment. The drive apparatus 100B of this embodiment performs pulse voltage application in which the power converter 300 sequentially applies positive and negative pulse voltages to phases of the synchronous motor 200, a plurality of times with pulse widths different from each other while the synchronous motor 200 is stopped. Further, the same reference numerals are assigned to the same portions as those in the configuration diagram of the drive apparatus 100A according to the first and second embodiments illustrated in FIG. 1, and the description thereof will be omitted.

In the first and second embodiments, the phase switch 420 in the voltage pulse preparing unit 400A prepares the phase command θ* for converting the d-axis voltage command Vd* and the q-axis voltage command Vq* prepared by the voltage command preparing unit 410 into three-phase voltage commands. Specifically, 0 degrees (0 radians), 120 degrees (⅔π radians), and 240 degrees (⁴⁄₃π radians) are sequentially output as the phase commands θ* for estimating the initial magnetic pole position θest while the synchronous motor 200 is stopped. On the other hand, in this embodiment, as illustrated in FIG. 12, the drive apparatus 100B includes a voltage pulse preparing unit 400B instead of the voltage pulse preparing unit 400A. The voltage pulse preparing unit 400B generates and outputs the phase command θ* so that the power converter 300 can apply a pulse voltage to the synchronous motor 200 a plurality of times with pulse widths different from each other while the synchronous motor 200 is stopped.

The phase command θ* output from the voltage pulse preparing unit 400B is input to the magnetic pole position estimating unit 600A described in the first embodiment or the magnetic pole position estimating unit 600B described in the second embodiment. Further, in this embodiment, the initial magnetic pole position θest may be estimated using any of the magnetic pole position estimating units 600A and 600B.

Figure 13:
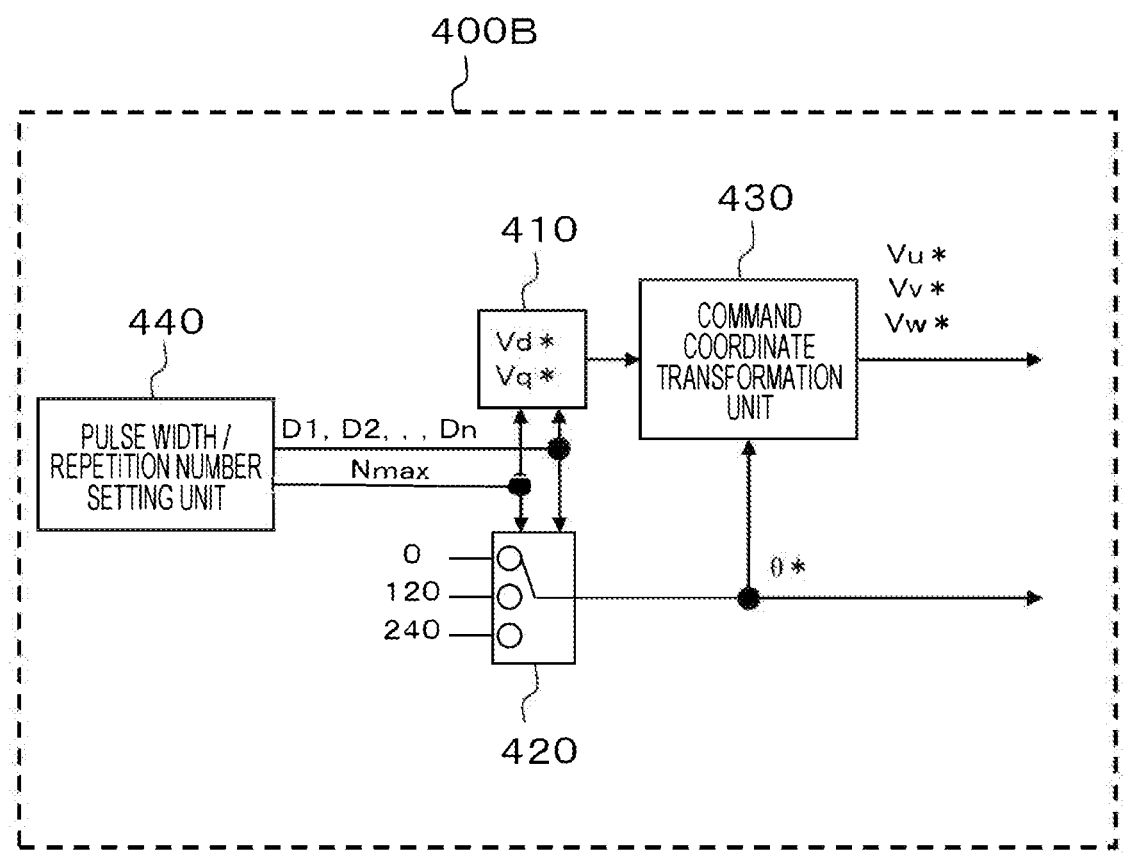
FIG. 13 is a detailed configuration diagram of a voltage pulse preparing unit according to the third embodiment.

FIG. 13 is a detailed configuration diagram of the voltage pulse preparing unit 400B according to the third embodiment. The voltage pulse preparing unit 400B includes a voltage command preparing unit 410, a phase switch 420, a command coordinate transformation unit 430, and a pulse width/repetition number setting unit 440. Further, the voltage command preparing unit 410, the phase switch 420, and the command coordinate transformation unit 430 are the same as those included in the voltage pulse preparing unit 400A in the first embodiment.

In the drive apparatus 100B of this embodiment, the initial magnetic pole position θest is estimated by repeatedly executing a series of operations described in the first or second embodiment in the magnetic pole position estimating unit 600A or 600B. In the voltage pulse preparing unit 400B of this embodiment, the pulse width/repetition number setting unit 440 outputs the number of repetitions Nmax of a series of operations performed by the magnetic pole position estimating unit 600A or 600B and a pulse width Dn of the d-axis voltage command Vd* output from the voltage command preparing unit 410 with respect to an n-th operation. Here, n is a natural number of 1 or more and Nmax or less. Further, the values of Nmax and Dn may be set in advance in the pulse width/repetition number setting unit 440 or may be optionally designated by the user.

Figure 14:
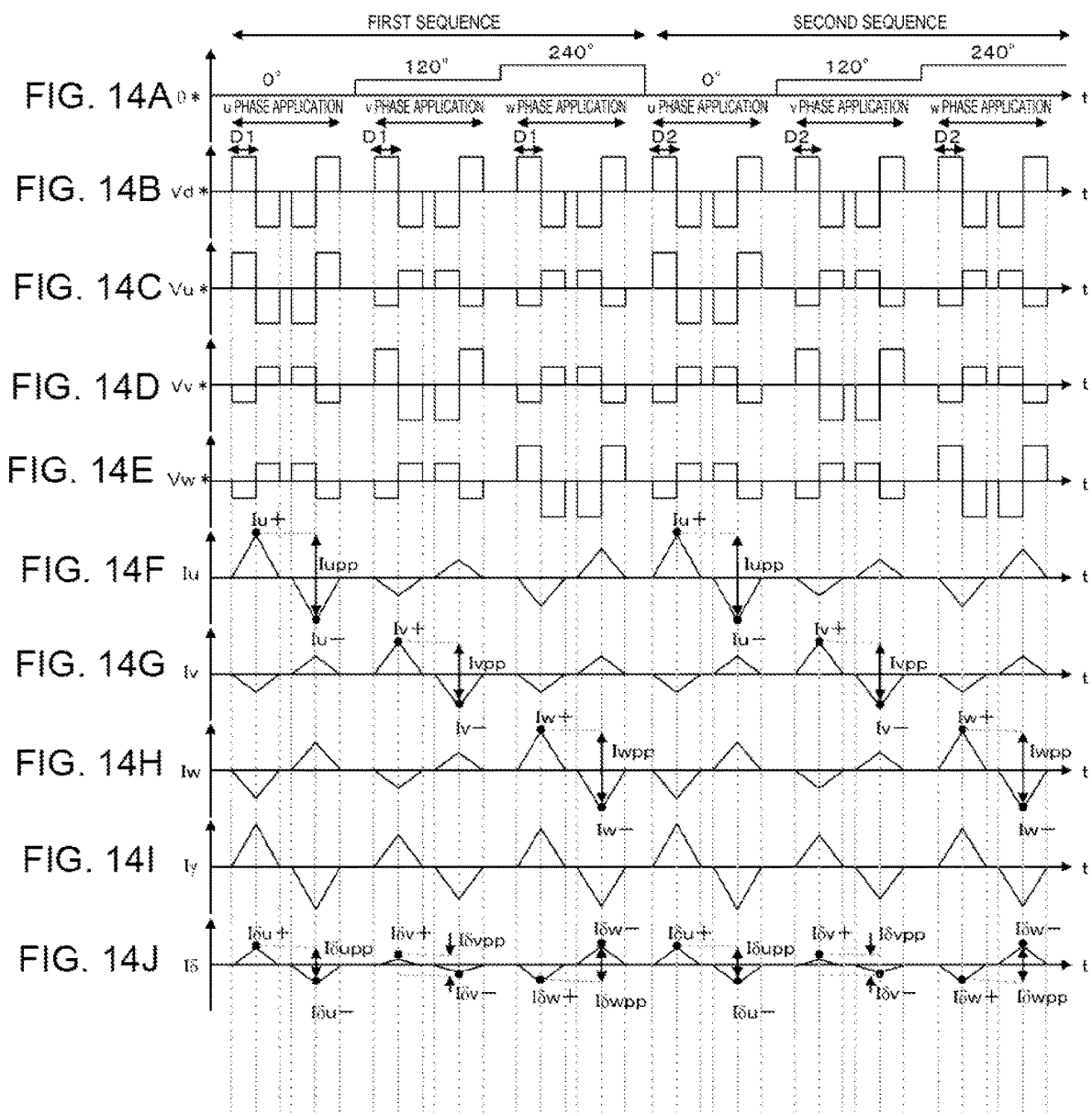
FIGS. 14A to 14J are diagrams illustrating a relationship between a phase command, a voltage command, and a current flowing to the synchronous motor in the third embodiment.

Operations of the drive apparatus 100B in the third embodiment will be described with reference to FIG. 14. FIG. 14 is a diagram illustrating a relationship between a phase command θ*, a voltage command, and a current flowing to the synchronous motor 200 in the third embodiment. FIG. 14 illustrates an example of the phase command θ*, the voltage command, and the current in a case where the number of repetitions Nmax output from the pulse width/repetition number setting unit 440 is 2. Further, FIGS. 14(A) to 14(J) illustrate the same as FIGS. 3 (A) to 3 (J), respectively.

In the case of FIG. 14, since Nmax=2, the magnetic pole position estimating unit 600A or 600B performs a series of operations of the initial magnetic pole position estimation described in the first or second embodiment twice. In this case, the pulse width/repetition number setting unit 440 sets a pulse width of the d-axis voltage command Vd* for the first operation (referred to as a first sequence) to D1. On the other hand, for the second operation (referred to as a second sequence), unlike the first sequence, a pulse width of the d-axis voltage command Vd* is set to D2.

In the voltage pulse preparing unit 400B of this embodiment, the voltage command preparing unit 410 prepares the d-axis voltage command Vd* according to the pulse widths in the first sequence and the second sequence as illustrated in FIG. 14(B) based on the pulse widths D1 and D2 output from the pulse width/repetition number setting unit 440. Consequently, as illustrated in FIGS. 14(C) to 14(E), three-phase voltage commands Vu*, Vv*, and Vw* to alternate positive and negative voltages with the pulse width D1 in the first sequence and the pulse width D2 in the second sequence are sequentially output from the command coordinate transformation unit 430.

In this embodiment, as illustrated in FIGS. 14(F) to 14(H), in the first sequence and the second sequence, the three-phase currents Iu, Iv, and Iw according to the pulse widths D1 and D2 set for the first sequence and the second sequence, respectively, flow to the synchronous motor 200. In addition, as illustrated in FIGS. 14(I) to 14(J), in the first sequence and the second sequence, quadrature components Iγ and Iδ of the three-phase currents according to the pulse widths D1 and D2 set for the first sequence and the second sequence, respectively, flow to the synchronous motor 200.

As described in the first embodiment, in the case of the interior permanent magnet synchronous motor, in the peak-to-peak values Iupp, Ivpp, and Iwpp of the phase currents, not only a current change due to the saliency but also a current change due to the magnetic saturation occur, and these current changes become error factors in the initial magnetic pole position. In the first and second embodiments, the estimation accuracy of the initial magnetic pole position θest is improved by using the peak-to-peak values Iδupp, Iδvpp, and Iδwpp of the quadrature components Iδ with respect to these error factors. However, even when a method for estimating the initial magnetic pole position θest by using the quadrature components of the phase currents is employed as described above, the influence of the magnetic saturation may not be completely eliminated depending on the structure of the synchronous motor 200, variations in the semiconductor elements constituting the power converter 300, and the like.

In this respect, in the drive apparatus 100B of this embodiment, by providing the pulse width/repetition number setting unit 440 in the voltage pulse preparing unit 400B, the power converter 300 sequentially applies positive and negative pulse voltages to the phases of the synchronous motor 200 with the pulse widths D1 and D2 different from each other while the synchronous motor 200 is stopped. Accordingly, the magnetic pole position estimating unit 600A or 600B estimates the initial magnetic pole position θest based on the peak values Iu+, Iu−, Iv+, Iv−, Iw+, and Iw− of the phase currents detected with respect to the application of the respective pulse voltages.

Specifically, with respect to the pulse voltage application performed with the pulse width D1 in the first sequence, the magnetic pole position estimating unit 600A or 600B calculates the first magnetic pole position θest1 by the first magnetic pole position calculating unit 640, based on the peak-to-peak values Iupp, Ivpp, and Iwpp of the phase currents Iu, Iv, and Iw obtained by the first peak-to-peak detector 610 and the peak-to-peak values Iδupp, Iδvpp, and Iδwpp of the quadrature components Iδ of the phase currents obtained by the second peak-to-peak detector 620. In addition, the polarity discriminator 650 or the fourth magnetic pole position calculating unit 680 discriminates whether the polarity of the magnet of the rotor is the N pole or the S pole by obtaining the second magnetic pole position θest2 according to the above-described expression (18) with respect to the pulse voltage application performed with the pulse width D2 in the second sequence. The initial magnetic pole position θest can be estimated based on the first magnetic pole position θest1 and the polarity discrimination result obtained as described above.

In this case, the pulse width D1 of the first sequence is made short to the extent that, for example, the magnetic saturation does not occur, and the influence of the magnetic saturation is made as small as possible in advance, so that it can be difficult to have the influence of the magnetic saturation. However, since the magnetic saturation does not occur, there is a risk of erroneous polarity discrimination. Therefore, in the second sequence, the pulse width D2 is made larger than D1 to generate magnetic saturation, and polarity discrimination is made reliable. Then, the initial magnetic pole position θest can be obtained with high accuracy by obtaining the initial magnetic pole position θest by using the first magnetic pole position θest1 obtained in the first sequence and the polarity obtained in the second sequence.

In this embodiment, as described above, the pulse width/repetition number setting unit 440 provided in the voltage pulse preparing unit 400B enables the estimation accuracy of the initial magnetic pole position θest to be further improved.

Further, in the drive apparatus 100B of this embodiment, the number of repetitions Nmax set by the pulse width/repetition number setting unit 440 of the voltage pulse preparing unit 400B may be set to 2 or more, and the final estimation result of the initial magnetic pole position θest may be determined from the value of the initial magnetic pole positions θest estimated in the respective sequences by the magnetic pole position estimating unit 600A or 600B. Specifically, by storing the initial magnetic pole positions θest in the respective sequences in the magnetic pole position estimating unit 600A or 600B, a plurality of initial magnetic pole positions θest according to the number of repetitions Nmax are acquired. Then, by performing predetermined statistical processing such as averaging processing or convergence calculation on the plurality of acquired initial magnetic pole positions θest, it is possible to obtain a final estimation result of the initial magnetic pole position θest. Besides this, various applications are possible.

Fourth Embodiment

Figure 15:
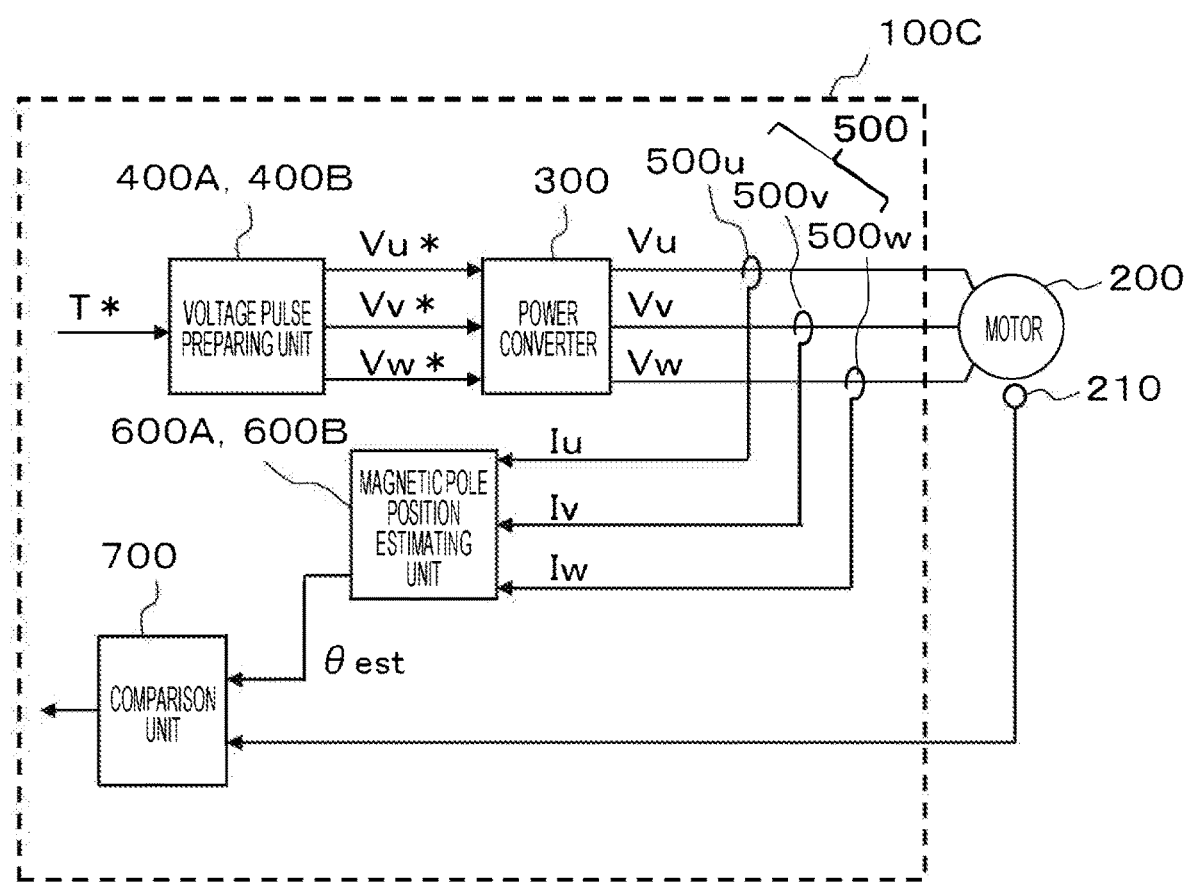
FIG. 15 is a configuration diagram of a drive apparatus according to a fourth embodiment.

FIG. 15 is a configuration diagram of a drive apparatus 100C according to a fourth embodiment. The drive apparatus 100C of this embodiment includes a position sensor 210 that detects a magnetic pole position of the synchronous motor 200, and the drive apparatus determines presence or absence of an anomaly of the position sensor 210 by comparing the initial magnetic pole position θest estimated while the synchronous motor 200 is stopped with a magnetic pole position detected by the position sensor 210. Further, the same reference numerals are assigned to the same portions as those in the configuration diagram of the drive apparatus 100A according to the first and second embodiments illustrated in FIG. 1 and the same portions as those in the configuration diagram of the drive apparatus 100B according to the third embodiment illustrated in FIG. 12, and the description thereof will be omitted.

In this embodiment, the synchronous motor 200 includes the position sensor 210 that detects the magnetic pole position of the synchronous motor 200. The magnetic pole position detected by the position sensor 210 is input to one of comparison units 700. The initial magnetic pole position θest estimated by the magnetic pole position estimating unit 600A described in the first embodiment or the magnetic pole position estimating unit 600B described in the second embodiment is input to the other of the comparison units 700. The magnetic pole position estimating unit 600A or 600B estimates the initial magnetic pole position θest using the phase command θ* output from the voltage pulse preparing unit 400A described in the first embodiment or the voltage pulse preparing unit 400B described in the third embodiment. Further, in this embodiment, the initial magnetic pole position θest may be estimated using any of the magnetic pole position estimating units 600A and 600B. The comparison units 700 compare the initial magnetic pole positions θest estimated while the synchronous motor 200 is stopped with the magnetic pole position detected by the position sensor 210 and determines the presence or absence of the anomaly of the position sensor 210 based on the comparison result.

The position sensor 210 such as a resolver may malfunction due to disconnection or short circuit of an output winding thereof. When the synchronous motor 200 is rotating, the malfunction can be detected, but it is difficult to detect the malfunction while the synchronous motor 200 is stopped. Since the magnetic pole position estimating units 600A and 600B described in the first and second embodiments, respectively, can estimate the initial magnetic pole positions θest while the synchronous motor 200 is stopped, it is possible to detect the malfunction of the position sensor 210 even when the synchronous motor 200 is stopped. Consequently, it is possible to provide the drive apparatus 100C of the synchronous motor 200 with higher reliability.

In the first to fourth embodiments, the voltage pulse preparing units 400A and 400B, the magnetic pole position estimating units 600A and 600B, the comparison units 700, and the like have been described as hardware, but the functions thereof may be realized by a computer and a program. Accordingly, the program can be processed by a computer including a CPU, a memory, and the like. All or part of the processing may be realized by a hard logic circuit. Moreover, the program may be supplied as various forms of computer readable computer program products such as a storage medium and a data signal (carrier wave).

According to the embodiments described above, the following operational effects can be obtained.

(1) The drive apparatus 100A, 100B, or 100C of the synchronous motor 200 includes the power converter 300 that drives the synchronous motor 200 by sequentially applying positive and negative voltages to phases of the synchronous motor 200, the current detecting unit 500 that detects phase currents flowing to the synchronous motor 200, and the magnetic pole position estimating unit 600A or 600B that estimates the magnetic pole position of the rotor of the synchronous motor 200, based on the phase currents detected by the current detecting unit 500. The magnetic pole position estimating unit 600A or 600B includes the first peak-to-peak detector 610 that detects the first peak-to-peak values Iupp, Ivpp, and Iwpp representing differences between maximum values and minimum values of the phase currents, the quadrature component detector 630 that detects quadrature components Iδ with respect to the phase currents, and the second peak-to-peak detector 620 that detects second peak-to-peak values Iδupp, Iδvpp, and Iδwpp representing differences between maximum values and minimum values of the quadrature components IS. Accordingly, the magnetic pole position estimating unit 600A or 600B calculates the first magnetic pole position θest1 by the first magnetic pole position calculating unit 640, based on the first peak-to-peak values Iupp, Ivpp, and Iwpp detected by the first peak-to-peak detector 610 and the second peak-to-peak values Iδupp, Iδvpp, and Iδwpp detected by the second peak-to-peak detector 620 while the synchronous motor 200 is stopped, and estimates the initial magnetic pole position θest of the rotor by the second magnetic pole position calculating unit 660 or the fourth magnetic pole position calculating unit 680, based on the first magnetic pole position θest1. With this configuration, even when the synchronous motor 200 is either the interior permanent magnet synchronous motor or the surface permanent magnet synchronous motor, the initial magnetic pole position θest of the rotor of the synchronous motor 200 can be estimated with high accuracy while the synchronous motor 200 is stopped.

(2) The magnetic pole position estimating unit 600A further includes the polarity discriminator 650 configured to discriminate the polarity NS of the magnet of the rotor and estimates the initial magnetic pole position θest by the second magnetic pole position calculating unit 660, based on the polarity NS discriminated by the polarity discriminator 650 and the first magnetic pole position θest1. With this configuration, the initial magnetic pole position θest can be accurately estimated from the first magnetic pole position θest1 obtained by using the change in inductance due to the saliency that appears at a cycle of ½ times the rotation angle.

(3) The polarity discriminator 650 discriminates the polarity NS, based on the subtraction values ΔIu, ΔIv, and ΔIw of the respective absolute values of the maximum values and the minimum values of the phase currents. With this configuration, the polarity NS can be accurately discriminated from the degree of the magnetic saturation of the synchronous motor 200.

(4) The magnetic pole position estimating unit 600B calculates the second magnetic pole position θest2 by the third magnetic pole position calculating unit 670 from the subtraction values ΔIu, ΔIv, and ΔIw of the respective absolute values of the maximum values and the minimum values of the phase currents while the synchronous motor 200 is stopped, discriminates the polarity of the magnet of the rotor by the fourth magnetic pole position calculating unit 680 from the first magnetic pole position θest1 and the second magnetic pole position θest2, and estimates the initial magnetic pole position θest of the rotor, based on the discriminated polarity and the first magnetic pole position θest1. With this configuration, the initial magnetic pole position θest can be estimated with high accuracy while minimizing the time required to estimate the initial magnetic pole position θest.

(5) In the drive apparatus 100B, the power converter 300 performs pulse voltage application a plurality of times with pulse widths different from each other to sequentially apply positive and negative pulse voltages to the phases of the synchronous motor 200 in response to the voltage commands Vu*, Vv*, and Vw* output from the voltage pulse preparing unit 400B, while the synchronous motor 200 is stopped. The magnetic pole position estimating unit 600A or 600B estimates the initial magnetic pole position θest, based on the maximum values and the minimum values of the phase currents detected for each of the plurality of times of the pulse voltage application performed by the power converter 300. Specifically, the magnetic pole position estimating unit 600A or 600B calculates the first magnetic pole position θest1, based on the first peak-to-peak values Iupp, Ivpp, and Iwpp based on the maximum values and the minimum values of the phase currents detected with respect to the pulse voltage application performed with the first pulse width D1 and the second peak-to-peak values Iδupp, Iδvpp, and Iδwpp based on the maximum values and the minimum values of the quadrature components of the phase currents. In addition, the magnetic pole position estimating unit 600A or 600B discriminates the polarity NS of the magnet of the rotor, based on the subtraction values ΔIu, ΔIv, and ΔIw of the absolute values of the maximum values and the minimum values of the phase currents detected with respect to the pulse voltage application performed with the second pulse width D2 larger than the first pulse width D1. The initial magnetic pole position θest is estimated based on the calculation result of the first magnetic pole position θest1 and the discrimination result of the polarity NS obtained as described above. The magnetic pole position estimating unit 600A or 600B acquires the plurality of initial magnetic pole positions θest by estimating the initial magnetic pole positions θest for a plurality of times of the pulse voltage application, respectively, and determines the estimation results of the initial magnetic pole positions θest, based on the plurality of acquired initial magnetic pole positions θest. With this configuration, the estimation accuracy of the initial magnetic pole position θest can be further improved.

(6) In the drive apparatus 100C, the synchronous motor 200 includes the position sensor 210 that detects the magnetic pole position of the synchronous motor 200. In addition, the drive apparatus 100C of the synchronous motor 200 includes the comparison units 700 that compare the initial magnetic pole position θest obtained by the magnetic pole position estimating unit 600A or 600B with the magnetic pole position obtained by the position sensor 210. The comparison unit 700 determines presence or absence of an anomaly of the position sensor 210, based on the comparison result obtained by the comparison unit 700 while the synchronous motor 200 is stopped. With this configuration, it is possible to detect the malfunction of the position sensor 210, even when the synchronous motor 200 is stopped, and to provide a more reliable drive apparatus of the synchronous motor 200.

(7) The method for driving the synchronous motor 200 is the method for driving the synchronous motor 200 in the drive apparatus 100A, 100B, or 100C of the synchronous motor 200 including the power converter 300 that drives the synchronous motor 200 by sequentially applying positive and negative voltages to the phases of the synchronous motor 200, and the current detecting unit 500 that detects the phase currents flowing to the synchronous motor 200. The method for driving the synchronous motor 200 includes acquiring the first peak-to-peak values Iupp, Ivpp, and Iwpp representing differences between the maximum values and the minimum values of the phase currents detected by the current detecting unit 500 and the second peak-to-peak values Iδupp, Iδvpp, and Iδwpp representing differences between the maximum values and the minimum values of the quadrature components of the phase currents while the synchronous motor 200 is stopped, calculating the first magnetic pole position θest1 based on the acquired first peak-to-peak values Iupp, Ivpp, and Iwpp and the acquired second peak-to-peak values Iδupp, Iδvpp, and Iδwpp, and estimating the initial magnetic pole position θest of the rotor of the synchronous motor 200 based on the calculated first magnetic pole position θest1. Consequently, even when the synchronous motor 200 is either the interior permanent magnet synchronous motor or the surface permanent magnet synchronous motor, the initial magnetic pole position θest of the rotor of the synchronous motor 200 can be estimated with high accuracy while the synchronous motor 200 is stopped.

The present invention is not limited to the above-described embodiments, and other forms conceivable within the scope of the technical idea of the present invention are also included within the scope of the present invention as long as the features of the present invention are not impaired. In addition, a part of the configuration of a certain embodiment may be replaced with a configuration of another embodiment, or the configuration of the other embodiment may be added to the configuration of a certain embodiment.

REFERENCE SIGNS LIST 100A, 100B, 100C . . . drive apparatus
200 synchronous motor
210 position sensor
300 power converter
400A, 400B voltage pulse preparing unit
410 voltage command preparing unit
420 phase switch
430 command coordinate transformation unit
440 pulse width/repetition number setting unit
500 current detecting unit
600A, 600B magnetic pole position estimating unit
610 first peak-to-peak detector
620 second peak-to-peak detector
630 quadrature component detector
640 first magnetic pole position calculating unit
650 polarity discriminator
651 peak value detector
652 absolute value calculating unit
653 subtraction unit
654 coordinate transformation unit
655 polarity calculating unit
660 second magnetic pole position calculating unit
670 third magnetic pole position calculating unit
671 peak value detector
672 absolute value calculating unit
673 subtraction unit
674 coordinate transformation
675 position calculating unit
680 fourth magnetic pole position calculating unit
681 subtraction processing unit
682 absolute value processing unit
683 threshold determining unit
684 initial magnetic pole position calculating unit
700 comparison unit

The invention claimed is:
1. A drive apparatus of a synchronous motor comprising:
a power converter that drives the synchronous motor by sequentially applying positive and negative voltages to phases of the synchronous motor;
a current detecting unit that detects a phase current flowing to the synchronous motor; and
a magnetic pole position estimating unit that estimates a magnetic pole position of a rotor of the synchronous motor, based on the phase current detected by the current detecting unit, wherein the magnetic pole position estimating unit includes
a first peak-to-peak detector that detects a first peak-to-peak value representing a difference between a maximum value and a minimum value of the phase current,
a quadrature component detector that detects a quadrature component of the phase current, and
a second peak-to-peak detector that detects a second peak-to-peak value representing a difference between a maximum value and a minimum value of the quadrature component, wherein
the magnetic pole position estimating unit calculates a first magnetic pole position, based on the first peak-to-peak value detected by the first peak-to-peak detector and the second peak-to-peak value detected by the second peak-to-peak detector while the synchronous motor is stopped, and wherein
the magnetic pole position estimating unit estimates an initial magnetic pole position of the rotor, based on the first magnetic pole position.

2. The drive apparatus of the synchronous motor according to claim 1, wherein the magnetic pole position estimating unit further includes a polarity discriminator configured to discriminate a polarity of a magnet of the rotor and estimates the initial magnetic pole position, based on the polarity discriminated by the polarity discriminator and the first magnetic pole position.

3. The drive apparatus of the synchronous motor according to claim 2, wherein the polarity discriminator discriminates the polarity, based on a subtraction value of respective absolute values of the maximum value and the minimum value of the phase current.

4. The drive apparatus of the synchronous motor according to claim 1, wherein the magnetic pole position estimating unit calculates a second magnetic pole position from a subtraction value of respective absolute values of the maximum value and the minimum value of the phase current while the synchronous motor is stopped, discriminates a polarity of a magnet of the rotor from the first magnetic pole position and the second magnetic pole position, and estimates an initial magnetic pole position of the rotor, based on the discriminated polarity and the first magnetic pole position.

5. The drive apparatus of the synchronous motor according to claim 1, wherein
the power converter performs pulse voltage application a plurality of times with pulse widths different from each other to sequentially apply positive and negative pulse voltages to the phases of the synchronous motor, while the synchronous motor is stopped, and wherein
the magnetic pole position estimating unit estimates the initial magnetic pole position, based on the maximum value and the minimum value of the phase current detected for each of the plurality of times of the pulse voltage application performed by the power converter.

6. The drive apparatus of the synchronous motor according to claim 5, wherein
the magnetic pole position estimating unit performs
calculation of the first magnetic pole position, based on the first peak-to-peak value based on the maximum value and the minimum value of the phase current detected with respect to the pulse voltage application performed with a first pulse width and the second peak-to-peak value based on the maximum value and the minimum value of the quadrature component of the phase current,
discrimination of the polarity of the magnet of the rotor, based on a subtraction value of respective absolute values of the maximum value and the minimum value of the phase current detected with respect to the pulse voltage application performed with a second pulse width larger than the first pulse width, and
estimation of the initial magnetic pole position, based on a calculation result of the first magnetic pole position and a discrimination result of the polarity.

7. The drive apparatus of the synchronous motor according to claim 5, wherein the magnetic pole position estimating unit acquires a plurality of the initial magnetic pole positions by estimating the initial magnetic pole positions for a plurality of times of the pulse voltage application, respectively, and determines estimation results of the initial magnetic pole positions, based on the plurality of acquired initial magnetic pole positions.

8. The drive apparatus of the synchronous motor according to claim 1, wherein
the synchronous motor includes a position sensor that detects a magnetic pole position of the synchronous motor, and wherein
the drive apparatus of the synchronous motor includes a comparison unit that compares the initial magnetic pole position obtained by the magnetic pole position estimating unit with the magnetic pole position obtained by the position sensor, and wherein
the comparison unit determines presence or absence of an anomaly of the position sensor, based on a comparison result obtained by the comparison unit while the synchronous motor is stopped.

9. A method for driving a synchronous motor in a drive apparatus of a synchronous motor which includes a power converter that drives a synchronous motor by sequentially applying positive and negative voltages to phases of the synchronous motor and a current detecting unit that detects a phase current flowing to the synchronous motor, the method comprising:
acquiring a first peak-to-peak value representing a difference between a maximum value and a minimum value of the phase current detected by the current detecting unit and a second peak-to-peak value representing a difference between a maximum value and a minimum value of a quadrature component of the phase current while the synchronous motor is stopped;
calculating a first magnetic pole position based on the first peak-to-peak value and the second peak-to-peak value; and
estimating an initial magnetic pole position of a rotor of the synchronous motor based on the first magnetic pole position.

* * * * *